United States Patent
Benedetto et al.

(10) Patent No.: US 11,045,737 B2
(45) Date of Patent: Jun. 29, 2021

(54) IN-GAME LOCATION BASED GAME PLAY COMPANION APPLICATION

(71) Applicant: Sony Interactive Entertainment LLC, San Mateo, CA (US)

(72) Inventors: Warren Benedetto, San Mateo, CA (US); Landon Noss, San Mateo, CA (US); Adil Sherwani, San Mateo, CA (US); Akihiko Kusumoto, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 83 days.

(21) Appl. No.: 15/474,331

(22) Filed: Mar. 30, 2017

(65) Prior Publication Data

US 2017/0354892 A1 Dec. 14, 2017

Related U.S. Application Data

(63) Continuation-in-part of application No. 15/411,421, filed on Jan. 20, 2017.
(Continued)

(51) Int. Cl.
*A63F 13/87* (2014.01)
*A63F 13/216* (2014.01)
*A63F 13/31* (2014.01)
*A63F 13/58* (2014.01)
*A63F 13/50* (2014.01)

(52) U.S. Cl.
CPC ............ *A63F 13/87* (2014.09); *A63F 13/216* (2014.09); *A63F 13/31* (2014.09); *A63F 13/50* (2014.09);
(Continued)

(58) Field of Classification Search
CPC ........ A63F 13/87; A63F 13/216; A63F 13/31; A63F 13/50; A63F 13/58;
(Continued)

(56) References Cited

U.S. PATENT DOCUMENTS 9,782,668 B1* 10/2017 Golden ................ A63F 13/216
2007/0052712 A1 3/2007 Saito et al.
(Continued)

FOREIGN PATENT DOCUMENTS

EP 2 745 894 A2 6/2014

OTHER PUBLICATIONS

ISR & Written Opinion PCT/US2017/036643, dated Sep. 21, 2017, 10 pages.
(Continued)

*Primary Examiner* — Yingchuan Zhang
(74) *Attorney, Agent, or Firm* — Penilla IP, APC

(57) ABSTRACT

A method for gaming. The method including receiving location based information of game play of a user playing a gaming application as displayed on a first computing device, wherein the location based information is made with reference to a location of a character in the game play of the user in a gaming world associated with the gaming application. The method including aggregating location based information of a plurality of game plays of a plurality of users playing the gaming application. The method including generating contextually relevant information for the location of the character based on the location based information of the plurality of game plays. The method including generating a companion interface including the contextually relevant information. The method including sending the companion interface to a second computing device associated with the user for display concurrent with the game play of the user.

26 Claims, 14 Drawing Sheets

Related U.S. Application Data

(60) Provisional application No. 62/365,202, filed on Jul. 21, 2016, provisional application No. 62/349,546, filed on Jun. 13, 2016, provisional application No. 62/375,834, filed on Aug. 16, 2016.

(52) U.S. Cl.
CPC ........ *A63F 13/58* (2014.09); *A63F 2300/308* (2013.01); *A63F 2300/69* (2013.01)

(58) Field of Classification Search
CPC .......... A63F 2300/572; A63F 2300/807; A63F 9/24; A63F 13/00; G06Q 10/10
See application file for complete search history.

(56) References Cited

U.S. PATENT DOCUMENTS

| | | | |
|---|---|---|---|
| 2007/0191097 A1* | 8/2007 | Johnson | A63F 13/87 463/40 |
| 2008/0268960 A1* | 10/2008 | Farrier | A63F 13/12 463/42 |
| 2013/0165234 A1* | 6/2013 | Hall | A63F 13/00 463/42 |
| 2013/0337916 A1* | 12/2013 | Saretto | A63F 13/77 463/32 |
| 2014/0143687 A1 | 5/2014 | Tan et al. | |
| 2014/0171039 A1* | 6/2014 | Bjontegard | H04W 4/029 455/414.1 |
| 2014/0256428 A1* | 9/2014 | Nakatsu | A63F 13/45 463/31 |
| 2015/0024783 A1 | 1/2015 | Konno et al. | |
| 2015/0375102 A1 | 12/2015 | George | |
| 2017/0087471 A1* | 3/2017 | Knutsson | A63F 13/35 |

OTHER PUBLICATIONS

Rabasa Garcia, Carmen_PCT International Search Report and Written Opinion, PCT/US2017/036641, dated Sep. 28, 2017 _ 11 pages.

* cited by examiner

IN-GAME LOCATION BASED GAME PLAY COMPANION APPLICATION

CLAIM OF PRIORITY

The present application claims priority to and the benefit of the commonly owned, provisional patent application, U.S. Ser. No. 62/365,202, filed on Jul. 21, 2016, entitled "GAME PLAY COMPANION APPLICATION," which is herein incorporated by reference in its entirety.

The present application claims priority to and the benefit of the commonly owned, provisional patent application, U.S. Ser. No. 62/349,546, filed on Jun. 13, 2016, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," which is herein incorporated by reference in its entirety.

The present application is a continuation-in-part of and claims priority to and the benefit of the commonly owned, patent application U.S. Ser. No. 15/411,421, filed on Jan. 20, 2017 entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," which claims priority to and the benefit of the commonly owned, provisional patent application, U.S. Ser. No. 62/349, 546, filed on Jun. 13, 2016, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," which is herein incorporated by reference in its entirety.

The present application claims priority to and the benefit of the commonly owned, provisional patent application, U.S. Ser. No. 62/375,834, filed on Aug. 16, 2016, entitled "METHOD AND SYSTEM FOR ACCESSING PREVIOUSLY STORED GAME PLAY VIA A VIDEO RECORDING AS EXECUTED ON A GAME CLOUD SYSTEM," which is herein incorporated by reference in its entirety.

CROSS REFERENCE TO RELATED APPLICATIONS

This application is related to commonly assigned, U.S. patent application Ser. No. 13/779,730, entitled "SYSTEMS AND METHODS FOR TAGGING CONTENT OF SHARED CLOUD EXECUTED MINI-GAMES AND TAG SHARING CONTROLS," filed on Feb. 27, 2013, the disclosure of which is hereby incorporated by reference in its entirety. This application is related to commonly assigned, U.S. patent application Ser. No. 13/792,664, entitled "USER-BASED MINI-GAME GENERATION AND DISTRIBUTION," filed on Mar. 11, 2013, the disclosure of which is hereby incorporated by reference in its entirety. This application is related to commonly assigned U.S. Pat. No. 8,870,661, entitled "CLOUD-BASED GAME SLICE GENERATION AND FRICTIONLESS SOCIAL SHARING WITH INSTANT PLAY," filed on Mar. 12, 2013, the disclosure of which is hereby incorporated by reference in its entirety. This application is related to commonly assigned, U.S. patent application Ser. No. 13/844,558, entitled "Systems and Methods for Managing Video Game Titles and User Play Metrics for Video Game Titles Executing on a Game Cloud System," filed on Mar. 15, 2013, the disclosure of which is hereby incorporated by reference in its entirety. This application is related to commonly assigned, U.S. patent application Ser. No. 14/526,472, entitled "CLOUD-BASED GAME SLICE GENERATION AND FRICTIONLESS SOCIAL SHARING WITH INSTANT PLAY," filed on Oct. 28, 2014, the disclosure of which is hereby incorporated by reference in its entirety.

TECHNICAL FIELD

The present disclosure is related to video games. Among other things, this disclosure describes methods and systems for a location based companion application supporting game play of a user playing a gaming application.

BACKGROUND OF THE DISCLOSURE

Cloud-based systems, using computing resources (hardware and software), deliver services over a network (e.g., the internet). The services, in the context of gaming, enable streaming of content to remote clients, wherein most processing is done on servers, which may be distributed. In some cases, the video game is executing in a cloud-based system, wherein input provided at the remote clients will in turn drive execution of the video game, without the need for dedicated gaming hardware at the client's location. Cloud-based processing and gaming, therefore, has been increasing in popularity because users find it easier to access more video game titles without complex hardware restrictions, and game suppliers find it easier to manage game code from centralized locations. Also, the higher processing power of the cloud servers allows video games to become more complex and expansive.

However, with video game complexity, users may find it increasingly difficult to navigate through and/or complete the video game. For example, video games may become more expansive and include millions and even trillions of available options available to users. As such, a user could not possibly even try each of those available options, or even understand which of those options are available. In other cases, a user may reach a point in a video game that is seemingly impossible to navigate through or solve. For users, this occurs quite frequently where the user increasingly becomes frustrated with a game due to its difficulty or an inability to advance through the game and eventually ends up quitting the video game. For instance, in the game play of a video game the user may be trying to pass through an obvious gateway to reach another part of the gaming world in order to advance the game play. To illustrate, a user may need to go through a waterfall acting as the gateway, and has seemingly exhausted all available options in trying to pass. However, even though a solution is available and simple if known (e.g., pick up stabilizing rock and run through the waterfall), for whatever reason the user is unable to find the correct path or sequence of operations to gain entry. After hours of futility, the user may end up quitting the game because the user can find no way to advance.

It is in this context that embodiments of the disclosure arise.

SUMMARY

Embodiments of the present disclosure relate to a location based companion interface supporting game play of a user playing a gaming application. Several inventive embodiments of the present disclosure are described below.

In one embodiment, a method for gaming is disclosed. The method includes receiving location based information of game play of a user playing a gaming application as displayed on a first computing device, wherein the location based information is made with reference to a location of a character in the game play of the user in a gaming world associated with the gaming application. The method includes receiving and aggregating location based information of a plurality of game plays of a plurality of users playing the gaming application. The method includes generating contextually relevant information for the location of the character based on the location based information of the plurality of game plays. The method includes generating a companion interface including the contextually relevant information. The method includes sending the companion interface to a second computing device associated with the user for display concurrent with the game play of the user.

In another embodiment, a method for gaming is disclosed. The method includes instantiating a first instance of a gaming application in association with game play of a user. The method includes delivering data representative of the game play of the user to a first computing device over a first communication channel for interaction by the user. The method includes determining location based information for a character in the game play of the user, wherein the location information is made with reference to a gaming world associated with the gaming application. The method includes aggregating location based information of a plurality of game plays of a plurality of users playing the gaming application. The method includes generating contextually relevant information for the location of the character based on the location based information of the plurality of game plays. The method includes generating a companion interface including the contextually relevant information. The method includes sending the companion interface over a second communication channel to a second computing device associated with the user for display concurrent with the game play of the user.

In still another embodiment, another method for gaming is disclosed. The method includes instantiating a first instance of a gaming application in association with game play of a user. The method includes delivering data representative of the game play of the user to a first computing device over a first communication channel for interaction by the user. The method includes determining location based information for a character in the game play of the user, wherein the location information is made with reference to a gaming world associated with the gaming application. The method includes generating contextually relevant information for the location of the character based on the location based information, wherein the contextually relevant information includes an offer to complete a task within the game play of the user. The method includes generating a companion interface including the contextually relevant information. The method includes sending the companion interface over a second communication channel to a second computing device associated with the user for display concurrent with the game play of the user. The method includes receiving an acceptance of the offer. The method includes instantiating a second instance of the gaming application in a first jump game play based on a first snapshot generated during execution of the first instance. The first snapshot includes first game state of the first instance and the location based information, wherein the first jump game play begins from a point in the gaming application corresponding to the first snapshot. The method includes generating a second snapshot during execution of the second instance of the gaming application and includes second game state of the second instance. The second instance is controlled by an expert, and wherein the task is completed in the first jump game play. The method includes instantiating a third instance of the gaming application in a second jump game play based on the second snapshot, wherein the third instance is controlled by the user, wherein the task is completed in the second jump game play.

In another embodiment, a non-transitory computer-readable medium storing a computer program for gaming is disclosed. The computer-readable medium includes program instructions for receiving location based information of game play of a user playing a gaming application as displayed on a first computing device, wherein the location based information is made with reference to a location of a character in the game play of the user in a gaming world associated with the gaming application. The computer readable medium includes program instructions for aggregating location based information of a plurality of game plays of a plurality of users playing the gaming application. The computer readable medium includes program instructions for generating contextually relevant information for the location of the character based on the location based information of the plurality of game plays. The computer readable medium includes program instructions for generating a companion interface including the contextually relevant information. The computer readable medium includes program instructions for sending the companion interface to a second computing device associated with the user for display concurrent with the game play of the user.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
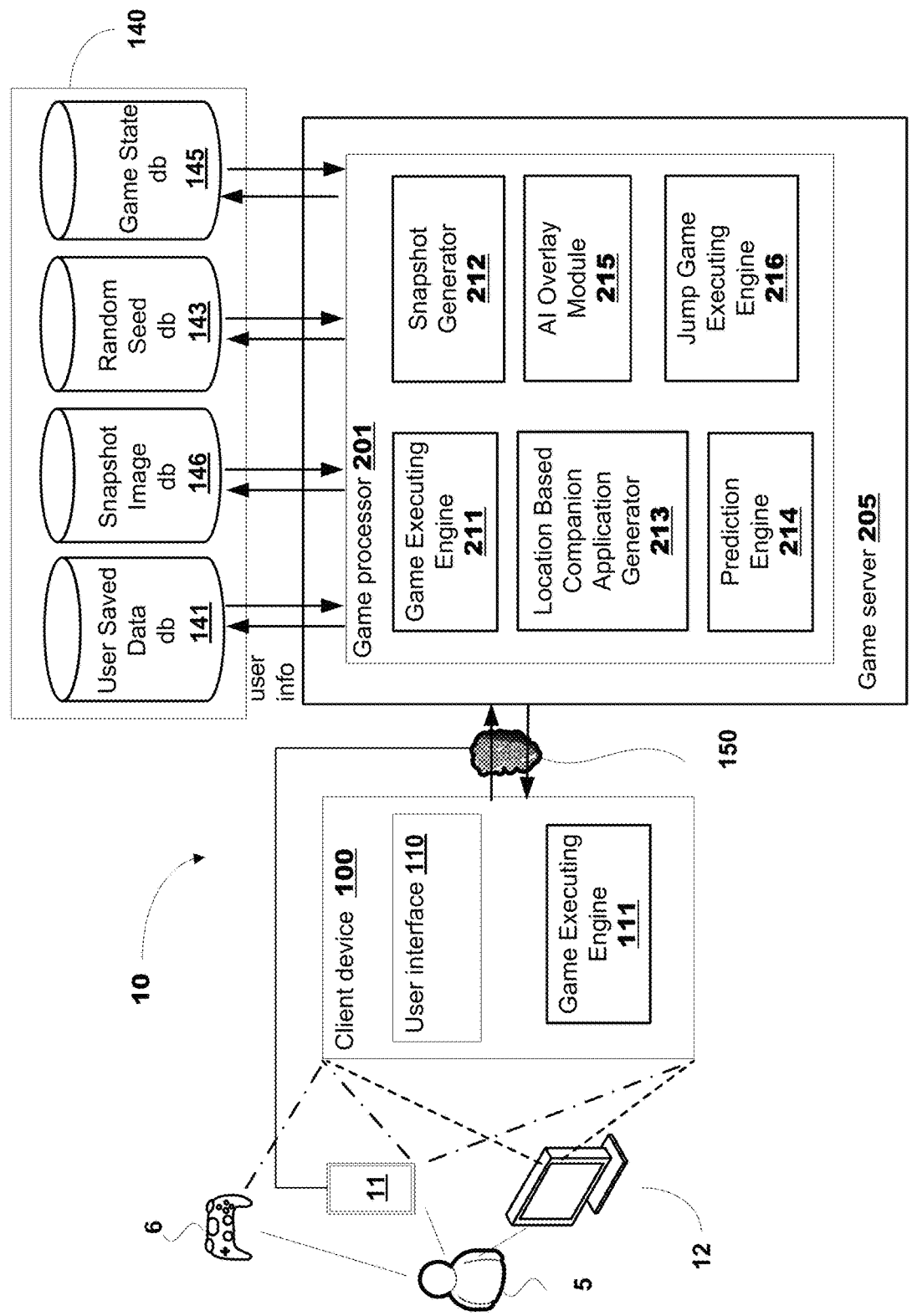
FIG. 1A illustrates a system used for implementing a location based companion interface supporting game play of a corresponding user, wherein the gaming application can be executing on a local computing device or over a cloud game network, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing a location based companion interface that is configured to support game play of a user. Embodiments of the present disclosure provide for additional uses of a gaming application through a location based companion interface. The companion interface includes contextually relevant information (e.g., messaging, assistance information, etc.) that is generated based on a location of a character in the game play of the user. The location based information includes defining parameters generated for snapshots collected periodically during the game play of the user. In particular, a snapshot contains metadata and/or information about the game play of the user, and is configurable to enable another instance of a corresponding gaming application at a jump point in the gaming application corresponding to the snapshot. The contextually relevant information also includes information collected during the game plays of other users playing the same gaming application. In that manner, the user is able to receive contextually relevant information based on the current progress of the user (e.g., location in gaming world, etc.). For example, the contextually relevant information can provide assistance in the game play of the user, wherein the information may be based on game play location, past game play, and anticipated game play. Further, the companion interface can be used to create messages from the user. For instance, a message can be a request for help, wherein the message is delivered to a targeted user or broadcast to a defined group (e.g., friends of the user), and displayable within corresponding companion interfaces. The companion interface may include messages for the user that are created by other users playing the gaming application. In other examples, a message can be created and delivered to one or more targeted users to enhance game play. For instance, a message may be triggered for display in a companion interface of a targeted user upon occurrence of an event, such as reaching a geographic location in the gaming world, or beating a boss, etc. The message may also be personalized to allow for person-to-person gaming or communication between the users. That is, the gaming application may be used in a multi-player environment via corresponding companion interfaces, wherein real time communication is enabled between two or users playing the gaming application and each companion interface provides information related to the game play of the other user. The contextually relevant information may include an offer of assistance from an expert to guide the user through the game play of the user, or for the expert to accomplish a task within the game play of the user.

With the above general understanding of the various embodiments, example details of the embodiments will now be described with reference to the various drawings.

Throughout the specification, the reference to "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

FIG. 1A illustrates a system 10 used for implementing a location based companion interface configured to support game play of a user playing a gaming application, wherein the gaming application can be executing on a local computing device or over a cloud game network, in accordance with one embodiment of the present disclosure. The companion interface may be used for creating content (e.g., assistance information, messages, etc.) for interaction by other users playing the gaming application, wherein the interaction may be through corresponding companion interfaces. The content is created based on location based information captured during game play of the user playing a gaming application, such as snapshot information. The companion interface may also be configured to provide assistance to the game play of the user by providing contextually relevant information to the user based on the past game play of the user, aggregated game plays of a plurality of users playing the same gaming application, location information of the game play of the user, and current progress of the game play of the user (including asset and skill accumulation, task completion, level completion, etc.).

As shown in FIG. 1A, the gaming application may be executing locally at a client device 100 of the user 5, or may be executing at a back-end game executing engine 211 operating at a back-end game server 205 of a cloud game network or game cloud system. The game executing engine 211 may be operating within one of many game processors 201 of game server 205. In either case, the cloud game network is configured to provide a location based companion interface supporting the game plays of one or more users playing a gaming application. Further, the gaming application may be executing in a single-player mode, or multi-player mode, wherein embodiments of the present invention provide for multi-player enhancements (e.g., assistance, communication, etc.) to both modes of operation.

In some embodiments, the cloud game network may include a plurality of virtual machines (VMs) running on a hypervisor of a host machine, with one or more virtual machines configured to execute a game processor module 201 utilizing the hardware resources available to the hypervisor of the host in support of single player or multi-player video games. In other embodiments, the cloud game network is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment.

As shown, system 10 includes a game server 205 executing the game processor module 201 that provides access to a plurality of interactive gaming applications. Game server 205 may be any type of server computing device available in the cloud, and may be configured as one or more virtual machines executing on one or more hosts, as previously described. For example, game server 205 may manage a virtual machine supporting the game processor 201. Game server 205 is also configured to provide additional services and/or content to user 5. For example, game server is configurable to provide a companion interface displayable to user 5 for purposes of generating and/or receiving contextually relevant information, as will be further described below.

Client device 100 is configured for requesting access to a gaming application over a network 150, such as the internet, and for rendering instances of video games or gaming applications executed by the game server 205 and delivered to the display device 12 associated with a user 5. For example, user 5 may be interacting through client device 100 with an instance of a gaming application executing on game processor 201. Client device 100 may also include a game executing engine 111 configured for local execution of the gaming application, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game.

Client device 100 is configured for receiving rendered images, and for displaying the rendered images on display 12. For example, through cloud based services the rendered images may be delivered by an instance of a gaming application executing on game executing engine 211 of game server 205 in association with user 5. In another example, through local game processing, the rendered images may be delivered by the local game executing engine 111. In either case, client device 100 is configured to interact with the executing engine 211 or 111 in association with the game play of user 5, such as through input commands that are used to drive game play.

Further, client device 100 is configured to interact with the game server 205 to capture and store snapshots of the game play of user 5 when playing a gaming application, wherein each snapshot includes information (e.g., game state, etc.) related to the game play. For example, the snapshot may include location based information corresponding to a location of a character within a gaming world of the game play of the user 5. Further, a snapshot enables a corresponding user to jump into a saved game play at a jump point in the gaming application corresponding to the capture of the snapshot. As such, user 5 can jump into his or her own saved game play at a jump point corresponding to a selected snapshot, another user may jump into the game play of the user 5, or user 5 may jump into the saved game play of another user at a jump point corresponding to a selected snapshot. Further, client device 100 is configured to interact with game server 205 to display a location based companion interface from the companion interface generator 213, wherein the companion interface is configured to receive and/or generate contextually relevant content, such as assistance information, messaging, interactive quests and challenges, etc. In particular, information contained in the snapshots captured during the game play of user 5, such as location based information relating to the game play, as well as information captured during game plays of other users, is used to generate the contextually relevant content.

More particularly, game processor 201 of game server 205 is configured to generate and/or receive snapshots of the game play of user 5 when playing the gaming application. For instance, snapshots may be generated by the local game execution engine 111 on client device 100, outputted and delivered over network 150 to game processor 201. In addition, snapshots may be generated by game executing engine 211 within the game processor 201, such as by an instance of the gaming application executing on engine 211. In addition, other game processors of game server 205 associated with other virtual machines are configured to execute instances of the gaming application associated with game plays of other users and to capture snapshots during those game play, wherein this additional information may be used to create the contextually relevant information.

Snapshot generator 212 is configured to capture a plurality of snapshots generated from the game play of user 5. Each snapshot provides information that enables execution of an instance of the video game beginning from a point in the video game associated with a corresponding snapshot. The snapshots are automatically generated during game play of the gaming application by user 5. Portions of each of the snapshots are stored in relevant databases independently configured or configured under data store 140, in embodiments. In another embodiment, snapshots may be generated manually through instruction by user 5. In that manner, any user through selection of a corresponding snapshot may jump into the game play of user 5 at a point in the gaming application associated with the corresponding snapshot. In addition, snapshots of game plays of other users playing a plurality of gaming applications may also be captured. As such, game processor 201 is configured to access information in database 140 in order to enable the jumping into a saved game play of any user based on a corresponding snapshot. That is, the requesting user is able to begin playing the video game at a jump point corresponding to a selected snapshot using the game characters of the original user's game play that generated and saved the snapshot.

A full discussion on the creation and use of snapshots is provided within U.S. application Ser. No. 15/411,421, entitled "Method And System For Saving A Snapshot of Game Play And Used To Begin Later Execution Of The Game Play By Any User As Executed On A Game Cloud System," which was previously incorporated by reference in its entirety. A brief description of the creation and implementation of snapshots follows below.

In particular, each snapshot includes metadata and/or information to enable execution of an instance of the gaming application beginning at a point in the gaming application corresponding to the snapshot. For example, in the game play of user 5, a snapshot may be generated at a particular point in the progression of the gaming application, such as in the middle of a level. The relevant snapshot information is stored in one or more databases of database 140. Pointers can be used to relate information in each database corresponding to a particular snapshot. In that manner, another user wishing to experience the game play of user 5, or the same user 5 wishing to re-experience his or her previous game play, may select a snapshot corresponding to a point in the gaming application of interest.

The metadata and information in each snapshot may provide and/or be analyzed to provide additional information related to the game play of the user. For example, snapshots may help determine where the user (e.g., character of the user) has been within the gaming application, where the user is in the gaming application, what the user has done, what assets and skills the user has accumulated, and where the user will be going within the gaming application. This additional information may be used to generate contextually relevant content for display to the user in a companion application interface (e.g., assistance information), or may be used to generate content configured for interaction with other users (e.g., quests, challenges, messages, etc.). In addition, the contextually relevant content may be generated based on other information (e.g., location based information) collected from other game plays of other users playing the gaming application.

The snapshot includes a snapshot image of the scene that is rendered at that point. The snapshot image is stored in snapshot image database 146. The snapshot image presented in the form of a thumbnail in a timeline provides a view into the game play of a user at a corresponding point in the progression by the user through a video game.

More particularly, the snapshot also includes game state data that defines the state of the game at that point. For example, game state data may include game characters, game objects, game object attributes, game attributes, game object state, graphic overlays, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Not all the game state data need be captured and stored, just the data that is sufficient for the executable code to start the game at the point corresponding to the snapshot. The game state data is stored in game state database 145.

The snapshot also includes user saved data. Generally, user saved data includes information that personalizes the video game for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the snapshot. For example, user saved data may include the game difficulty selected by the user 5 when playing the game, game level, character attributes, character location, number of lives left, the total possible number of lives available, armor, trophy, time counter values, and other asset information, etc. User saved data may also include user profile data that identifies user 5, for example. User saved data is stored in database 141.

In addition, the snapshot also includes random seed data that is generated by artificial intelligence (AI) module 215. The random seed data may not be part of the original game code, but may be added in an overlay to make the gaming environment seem more realistic and/or engaging to the user. That is, random seed data provides additional features for the gaming environment that exists at the corresponding point in the game play of the user. For example, AI characters may be randomly generated and provided in the overlay. The AI characters are not associated with any users playing the game, but are placed into the gaming environment to enhance the user's experience. As an illustration, these AI characters may randomly walk the streets in a city scene. In addition, other objects may be generated and presented in an overlay. For instance, clouds in the background and birds flying through space may be generated and presented in an overlay. The random seed data is stored in random seed database 143.

In that manner, another user wishing to experience the game play of user 5 may select a snapshot corresponding to a point in the video game of interest. For example, selection of a snapshot image presented in a timeline or node in a node graph by a user enables the jump executing engine 216 of game processor 201 to access the corresponding snapshot, instantiate another instance of the video game based on the snapshot, and execute the video game beginning at a point in the video game corresponding to the snapshot. In that manner, the snapshot enables the requesting user to jump into the game play of user 5 at the point corresponding to the snapshot. In addition, user 5 may access game plays of other users or even access his or her own prior game play in the same or other gaming application using corresponding snapshots. In particular, selection of the snapshot by user 5 (e.g., in a timeline, or through a message, etc.) enables executing engine 216 to collect the snapshot (e.g., metadata and/or information) from the various databases (e.g., from database 140) in order to begin executing the corresponding gaming application at a point where the corresponding snapshot was captured in a corresponding gaming application.

Game processor 201 includes a location based companion application generator 213 configured to generate a companion interface supporting the game play of user 5 when playing a gaming application. The generator 213 can be used to create contextually relevant information (e.g., assistance information, messages, etc.) to be delivered to or received from user 5 that is based on the game play of the user 5, wherein the contextually relevant information is created using location based information (e.g., snapshots). The contextually relevant information may also be based on information collected from game plays of other users playing the gaming application. In particular, generator 213 is configurable to determine progress of the game play of user 5 for a particular gaming application (e.g., based on snapshots) for a particular context of the game play (e.g., current location of character, game state information, etc.), and determine contextually relevant information that may be delivered to a companion interface displayable on device 11 that is separate from a device displaying the game play of user 5. For example, the contextually relevant information may provide information providing assistance in progressing through the gaming application. The contextually relevant information may consider information provided by a prediction engine 214 that is configured to predict where the game play of user 5 will go, to include what areas a character will visit, what tasks are required to advance the game play, what assets are needed in order to advance the game play (e.g., assets needed to accomplish a required task), etc. The companion interface may also be used to create contextually relevant content by user 5 for interaction by other users. For example, location based information shown in the companion interface (e.g., radar mapping, waypoints, etc.) may facilitate the creation of interactive content (e.g., quests, challenges, messages, etc.). That is, the user 5 may use location based information (e.g., snapshots) to create the interactive contextually relevant content. In another example, the companion interface can be used to create messages from the user, wherein the messages may be targeted to friends of the user asking for help or facilitating interactive communication (e.g., for multi-player gaming, taunting, etc.). The companion interface may be used to display messages from other users. The companion interface may also be used to display offers for assistance.

For example, in embodiments the location based information may be based on current and/or past game plays of multiple users playing the same gaming application in a crowd sourcing environment, such that the information may be determined through observation and/or analysis of the multiple game plays. In that manner, crowdsourced content may be discovered during the game plays, wherein the content may be helpful for other players playing the same gaming application, or provide an enhanced user experience to these other players. In another embodiment, the information provided in the companion interface may be related to game plays of users simultaneously playing the same gaming application (e.g., information is related to game plays of friends of the user who are simultaneously playing the gaming application, wherein the information provides real-time interaction between the friends), wherein the information advances the user's game play or provides an enhanced user experience. That is, the respective companion interfaces provide real-time interaction between the users. In still another embodiment, a user is playing the gaming application in isolation (e.g., playing alone), and receiving information through the companion interface that is helpful in advancing the game play of the first user, or for providing an enhanced user experience. In the solo case, the information (e.g., help, coaching, etc.) could be delivered in the form of recorded video, image, and/or text content. This information may not be generated in real-time, and may be generated by someone associated with the game developer (e.g., employed by the game publisher, console maker, etc.) whose role is to generate information for the benefit of users as conveyed through respective companion interfaces. In addition, third parties (profit based, non-profit based, etc.) may take it upon themselves to generate the information for the benefit of the gaming public. Further, the information may be generated by friends of the first user for the benefit solely for that player or for friends in a group. Also, the information may be generated by other related and/or unrelated users playing the gaming interface (e.g., crowdsourced). Further, the components used for implementation of the companion interface may be included within a game processor that is local to the user (e.g., located on device 11 or client device 100), or may be included within a back end server (e.g., game server 2015).

As shown, the companion interface is delivered to a device 11 (e.g., tablet) for display and interaction, wherein device 11 may be separate from client device 100 that is configured to execute and/or support execution of the gaming application for user 5 interaction. For instance, a first communication channel may be established between the game server 205 and client device 100, and a separate, second communication channel may be established between game server 205 and device 11.

Figure 1B:
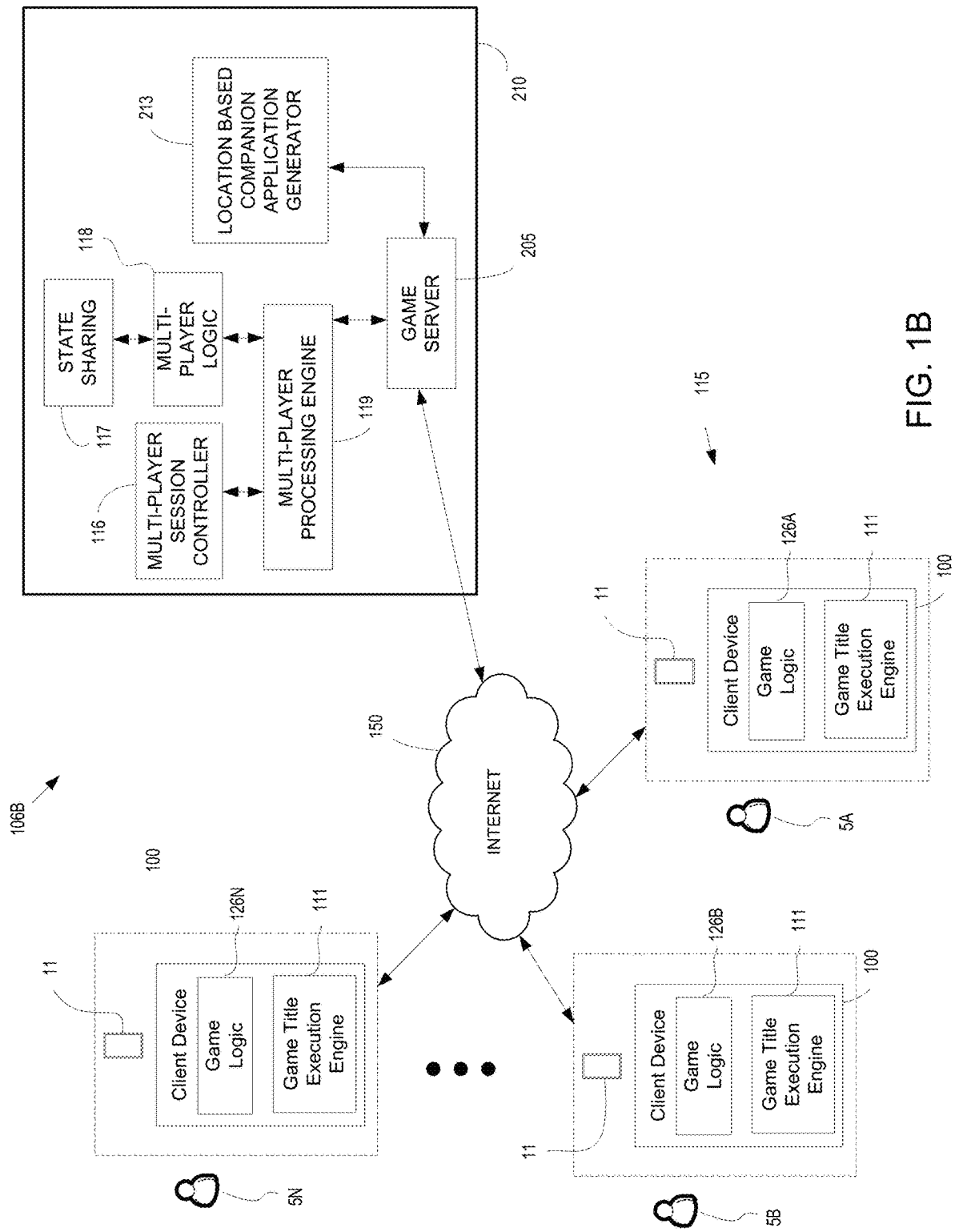
FIG. 1B illustrates a system providing gaming control to one or more users playing one or more gaming applications that are executing locally to the corresponding user, and wherein back-end server support may implement a location based companion interface supporting game play of a corresponding user, in accordance with one embodiment of the present disclosure.

FIG. 1B illustrates a system 106B providing gaming control to one or more users playing one or more gaming applications that are executing locally to the corresponding user, and wherein back-end server support (e.g., accessible through game server 205) may implement a location based companion interface supporting game play of a corresponding user, in accordance with one embodiment of the present disclosure. In one embodiment, system 106B works in conjunction with system 10 of FIG. 1A and system 200 of FIG. 2 to implement the location based companion interface supporting game play of a corresponding user. Referring now to the drawings, like referenced numerals designate identical or corresponding parts.

As shown in FIG. 1B, a plurality of users 115 (e.g., user 5A, user 5B . . . user 5N) is playing a plurality of gaming applications, wherein each of the gaming applications is executed locally on a corresponding client device 100 (e.g., game console) of a corresponding user. In addition, each of the plurality of users 115 has access to a device 11, previously introduced, configured to receive and/or generate a companion interface for display on device 11 the provides contextually relevant information for a corresponding user playing a corresponding gaming application, as previously described. Each of the client devices 100 may be configured similarly in that local execution of a corresponding gaming application is performed. For example, user 5A may be playing a first gaming application on a corresponding client device 100, wherein an instance of the first gaming application is executed by a corresponding game title execution engine 111. Game logic 126A (e.g., executable code) implementing the first gaming application is stored on the corresponding client device 100, and is used to execute the first gaming application. For purposes of illustration, game logic may be delivered to the corresponding client device 100 through a portable medium (e.g., flash drive, compact disk, etc.) or through a network (e.g., downloaded through the internet 150 from a gaming provider). In addition, user 5B is playing a second gaming application on a corresponding client device 100, wherein an instance of the second gaming application is executed by a corresponding game title execution engine 111. The second gaming application may be identical to the first gaming application executing for user 5A or a different gaming application. Game logic 126B (e.g., executable code) implementing the second gaming application is stored on the corresponding client device 100 as previously described, and is used to execute the second gaming application. Further, user 115N is playing an Nth gaming application on a corresponding client device 100, wherein an instance of the Nth gaming application is executed by a corresponding game title execution engine 111. The Nth gaming application may be identical to the first or second gaming application, or may be a completely different gaming application. Game logic 126N (e.g., executable code) implementing the third gaming application is stored on the corresponding client device 100 as previously described, and is used to execute the Nth gaming application.

As previously described, client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 205 over network 150. Also, client device 100 of a corresponding user is configured for generating rendered images executed by the game title execution engine 111 executing locally or remotely, and for displaying the rendered images on a display. For example, the rendered images may be associated with an instance of the first gaming application executing on client device 100 of user 5A. For example, a corresponding client device 100 is configured to interact with an instance of a corresponding gaming application as executed locally or remotely to implement a game play of a corresponding user, such as through input commands that are used to drive game play.

In one embodiment, client device 100 is operating in a single-player mode for a corresponding user that is playing a gaming application. Back-end server support via the game server 205 may provide location based companion interface services supporting game play of a corresponding user, as will be described below, in accordance with one embodiment of the present disclosure.

In another embodiment, multiple client devices 100 are operating in a multi-player mode for corresponding users that are each playing a specific gaming application. In that case, back-end server support via the game server may provide multi-player functionality, such as through the multi-player processing engine 119. In particular, multi-player processing engine 119 is configured for controlling a multi-player gaming session for a particular gaming application. For example, multi-player processing engine 130 communicates with the multi-player session controller 116, which is configured to establish and maintain communication sessions with each of the users and/or players participating in the multi-player gaming session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1C and FIG. 2, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 115A when playing the game, game level, character attributes, character location, number of lives left, the total possible number of lives available, armor, trophy, time counter values, etc. User saved data may also include user profile data that identifies a corresponding user 115A, for example. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may provide location based companion application services provided through a companion interface generated by companion application generator 213. As previously introduced, generator 213 is configured to create contextually relevant information (e.g., assistance information, messages, etc.) to be delivered to or received from user 5. The information is generated based on the game play of user 5 for a particular application (e.g., based on information provided in snapshots). In that manner, generator 213 is able to determine the context of the game play of user 5 and provide contextually relevant information that is deliverable to a comp interface displayable on device 11 (e.g., separate from the device displaying game play of user 5).

Figure 1C:
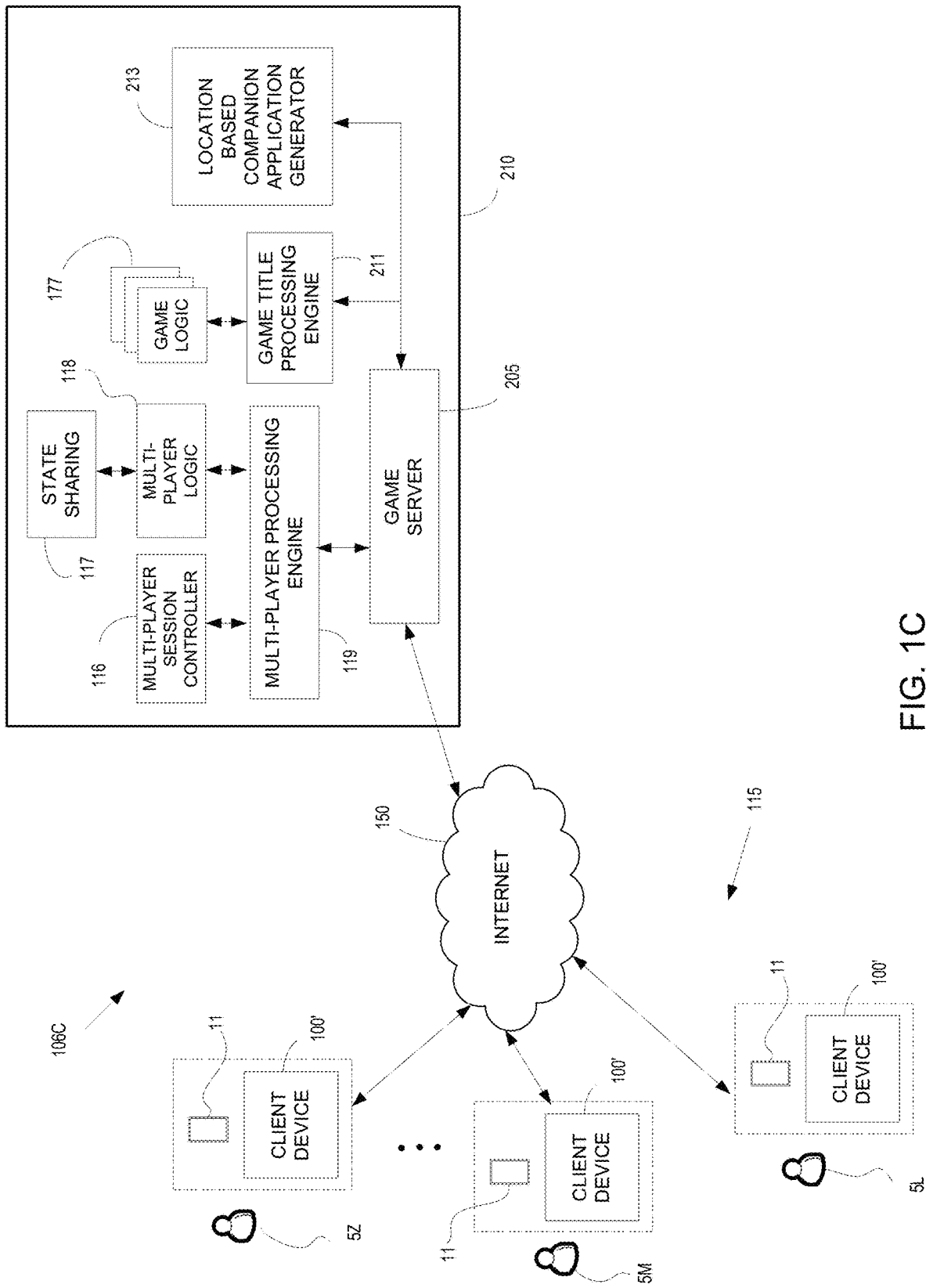
FIG. 1C illustrates a system providing gaming control to one or more users playing a gaming application as executed over a cloud game network, and wherein back-end server support may implement a location based companion interface supporting game play of a corresponding user, in accordance with one embodiment of the present disclosure.

FIG. 1C illustrates a system 106C providing gaming control to a plurality of users 115 (e.g., users 5L, 5M . . . 5Z) playing a gaming application as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. In one embodiment, system 106C works in conjunction with system 10 of FIG. 1A and/or system 200 of FIG. 2 to implement the location based companion interface supporting game play of a corresponding user. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 115. In that manner, back-end server support provides streaming of media (e.g., video, audio, etc.) of game plays of a plurality of gaming applications to a plurality of corresponding users.

A plurality of users 115 accesses the game cloud system 210 via network 150, wherein users (e.g., users 5L, 5M . . . 5Z) access network 150 via corresponding client devices 100', wherein client device 100' may be configured similarly as client device 100 of FIGS. 1A-1B (e.g., including game executing engine 111, etc.), or may be configured as a thin client providing that interfaces with a back end server providing computational functionality (e.g., including game executing engine 211). In addition, each of the plurality of users 115 has access to a device 11, previously introduced, configured to receive and/or generate a companion interface for display on device 11 that provides contextually relevant information for a corresponding user playing a corresponding gaming application, as previously described. In particular, a client device 100' of a corresponding user 5L is configured for requesting access to gaming applications over a network 150, such as the internet, and for rendering instances of gaming application (e.g., video game) executed by the game server 205 and delivered to a display device associated with the corresponding user 5L. For example, user 5L may be interacting through client device 100' with an instance of a gaming application executing on game processor of game server 205. More particularly, an instance of the gaming application is executed by the game title execution engine 211. Game logic (e.g., executable code) implementing the gaming application is stored and accessible through data store 140, previously described, and is used to execute the gaming application. Game title processing engine 211 is able to support a plurality of gaming applications using a plurality of game logics 177, as shown.

As previously described, client device 100' may receive input from various types of input devices, such as game controllers, tablet computers, keyboards, gestures captured by video cameras, mice touch pads, etc. Client device 100' can be any type of computing device having at least a memory and a processor module that is capable of connecting to the game server 205 over network 150. Also, client device 100' of a corresponding user is configured for generating rendered images executed by the game title execution engine 211 executing locally or remotely, and for displaying the rendered images on a display. For example, the rendered images may be associated with an instance of the first gaming application executing on client device 100' of user 5L. For example, a corresponding client device 100' is configured to interact with an instance of a corresponding gaming application as executed locally or remotely to implement a game play of a corresponding user, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user 115A at a particular point, as previously described. Further, state data may include user saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

In addition, back-end server support via the game server 205 may provide location based companion application services provided through a companion interface generated by companion application generator 213. As previously introduced, generator 213 is configured to create contextually relevant information (e.g., assistance information, messages, etc.) to be delivered to or received from a corresponding user (e.g., user 5L). The information is generated based on the game play of the user for a particular application (e.g., based on information provided in snapshots). In that manner, generator 213 is able to determine the context of the game play of the corresponding user and provide contextually relevant information that is deliverable to a comp interface displayable on device 11 (e.g., separate from the device displaying game play of user 5L).

Figure 2:
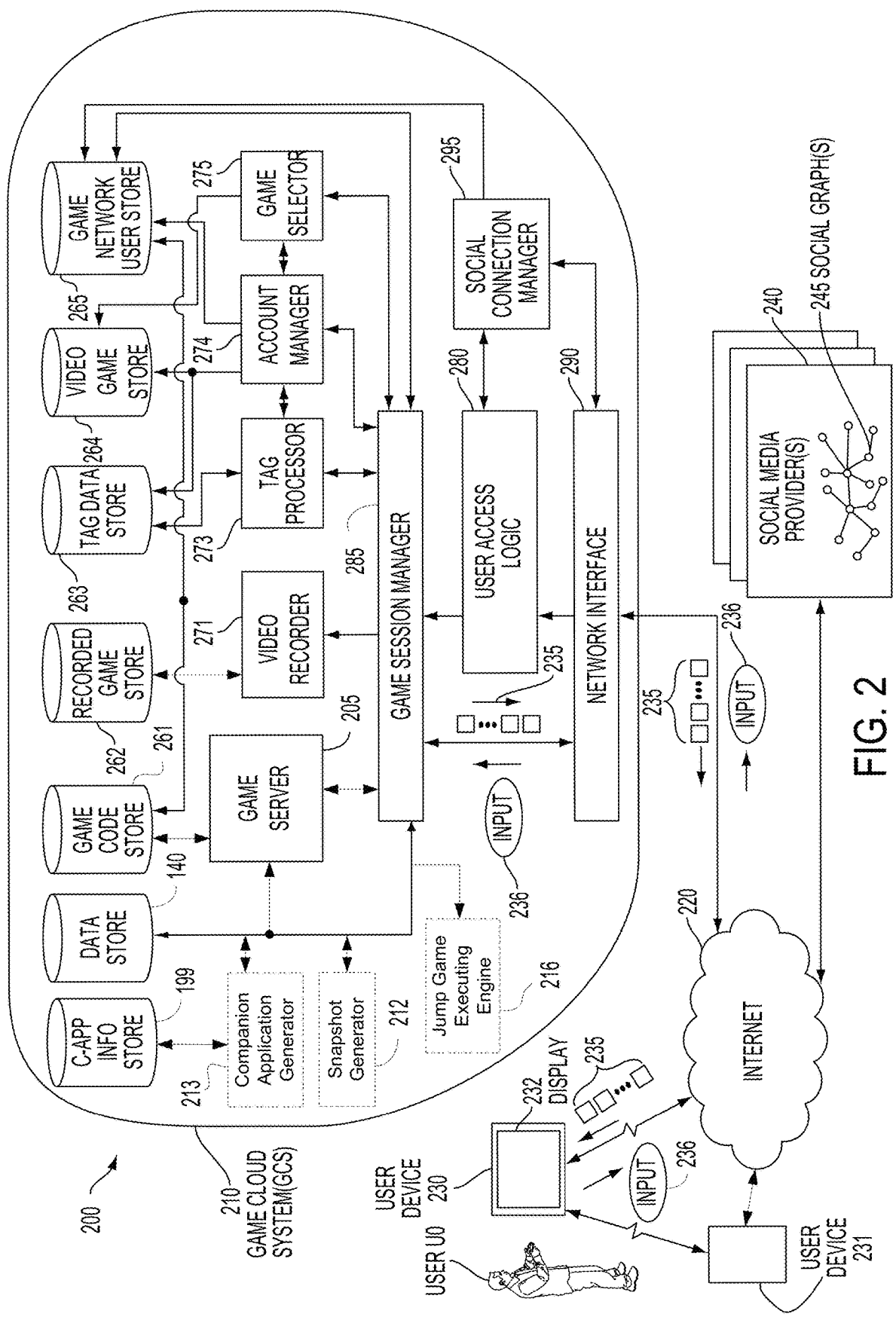
FIG. 2 illustrates a system diagram for enabling access and playing of gaming applications in a game cloud system (GCS), and implementation of a location based companion interface supporting game play of a corresponding user, in accordance with one embodiment of the present disclosure.

FIG. 2 illustrates a system diagram 200 for enabling access and playing of gaming applications stored in a game cloud system (GCS) 210, in accordance with an embodiment of the disclosure. Generally speaking, game cloud system GCS 210 may be a cloud computing system operating over a network 220 to support a plurality of users. Additionally, GCS 210 is configured to save snapshots generated during game plays of a gaming application of multiple users, wherein a snapshot can be used to initiate an instance of the gaming application for a requesting user beginning at a point in the gaming application corresponding to the snapshot. For example, snapshot generator 212 is configured for generating and/or capturing snapshots of game plays of one or more users playing the gaming application. The snapshot generator 212 may be executing external or internal to game server 205. In addition, GCS 210 through the use of snapshots enables a user to navigate through a gaming application, and preview past and future scenes of a gaming application. Further, the snapshots enable a requesting user to jump to a selected point in the video game through a corresponding snapshot to experience the game play of another user. In particular, system 200 includes GCS 210, one or more social media providers 240, and a user device 230, all of which are connected via a network 220 (e.g., internet). One or more user devices may be connected to network 220 to access services provided by GCS 210 and social media providers 240.

In one embodiment, game cloud system 210 includes a game server 205, a video recorder 271, a tag processor 273, and account manager 274 that includes a user profile manager, a game selection engine 275, a game session manager 285, user access logic 280, a network interface 290, and a social media manager 295. GCS 210 may further include a plurality of gaming storage systems, such as a game state store, random seed store, user saved data store, snapshot store, which may be stored generally in datastore 140. Other gaming storage systems may include a game code store 261, a recorded game store 262, a tag data store 263, video game data store 264, and a game network user store 265. In one embodiment, GCS 210 is a system that can provide gaming applications, services, gaming related digital content, and interconnectivity among systems, applications, users, and social networks. GCS 210 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

User $U_0$ is able to access services provided by GCS 210 via the game session manager 285, wherein user $U_0$ may be representative of user 5 of FIG. 1. For example, account manager 274 enables authentication and access by user $U_0$ to GCS 210. Account manager 274 stores information about member users. For instance, a user profile for each member user may be managed by account manager 274. In that manner, member information can be used by the account manager 274 for authentication purposes. For example, account manager 2274 may be used to update and manage user information related to a member user. Additionally, game titles owned by a member user may be managed by account manager 274. In that manner, gaming applications stored in data store 264 are made available to any member user who owns those gaming applications.

In one embodiment, a user, e.g., user $U_0$, can access the services provided by GCS 210 and social media providers 240 by way of user device 230 through connections over network 220. User device 230 can include any type of device having a processor and memory, wired or wireless, portable or not portable. In one embodiment, user device 230 can be in the form of a smartphone, a tablet computer, or hybrids that provide touch screen capability in a portable form factor. One exemplary device can include a portable phone device that runs an operating system and is provided with access to various applications (apps) that may be obtained over network 220, and executed on the local portable device (e.g., smartphone, tablet, laptop, desktop, etc.).

User device 230 includes a display 232 that acts as an interface for user $U_0$ to send input commands 236 and display data and/or information 235 received from GCS 210 and social media providers 240. Display 232 can be configured as a touch-screen, or a display typically provided by a flat-panel display, a cathode ray tube (CRT), or other device capable of rendering a display. Alternatively, the user device 230 can have its display 232 separate from the device, similar to a desktop computer or a laptop computer. Additional devices 231 (e.g., device 11 of FIG. 1A) may be available to user $U_0$ for purposes of implementing a location based companion interface.

In one embodiment, user device 130 is configured to communicate with GCS 210 to enable user $U_0$ to play a gaming application. In some embodiments, the GCS 210 may include a plurality of virtual machines (VMs) running on a hypervisor of a host machine, with one or more virtual machines configured to execute a game processor module utilizing the hardware resources available to the hypervisor of the host. For example, user $U_0$ may select (e.g., by game title, etc.) a gaming application that is available in the video game data store 264 via the game selection engine 275. The gaming application may be played within a single player gaming environment or in a multi-player gaming environment. In that manner, the selected gaming application is enabled and loaded for execution by game server 205 on the GCS 210. In one embodiment, game play is primarily executed in the GCS 210, such that user device 230 will receive a stream of game video frames 235 from GCS 210, and user input commands 236 for driving the game play is transmitted back to the GCS 210. The received video frames 235 from the streaming game play are shown in display 232 of user device 230. In other embodiments, the GCS 210 is configured to support a plurality of local computing devices supporting a plurality of users, wherein each local computing device may be executing an instance of a gaming application, such as in a single-player gaming application or multi-player gaming application. For example, in a multi-player gaming environment, while the gaming application is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player gaming application. In that manner, the cloud game network coordinates and combines the game plays for each of the users within the multi-player gaming environment.

In one embodiment, after user $U_0$ chooses an available game title to play, a game session for the chosen game title may be initiated by the user $U_0$ through game session manager 285. Game session manager 285 first accesses game state store in data store 140 to retrieve the saved game state of the last session played by the user $U_0$ (for the selected game), if any, so that the user $U_0$ can restart game play from a previous game play stop point. Once the resume or start point is identified, the game session manager 285 may inform game execution engine in game processor 201 to execute the game code of the chosen game title from game code store 261. After a game session is initiated, game session manager 285 may pass the game video frames 235 (i.e., streaming video data), via network interface 290 to a user device, e.g., user device 230.

During game play, game session manager 285 may communicate with game processor 201, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data stored 263.

During game play, game session manager 285 may communicate with game processor 201 of game server 205 to deliver and obtain user input commands 236 that are used to influence the outcome of a corresponding game play of a gaming application. Input commands 236 entered by user $U_0$ may be transmitted from user device 230 to game session manager 285 of GCS 210. Input commands 236, including input commands used to drive game play, may include user interactive input, such as including tag content (e.g., texts, images, video recording clips, etc.). Game input commands as well as any user play metrics (how long the user plays the game, etc.) may be stored in game network user store. Select information related to game play for a gaming application may be used to enable multiple features that may be available to the user.

Because game plays are executed on GCS 210 by multiple users, information generated and stored from those game plays enable any requesting user to experience the game play of other users, particularly when game plays are executed over GCS 210. In particular, snapshot generator 212 of GCS 210 is configured to save snapshots generated by the game play of users playing gaming applications through GCS 210. In the case of user $U_0$, user device provides an interface allowing user $U_0$ to engage with the gaming application during the game play. Snapshots of the game play by user $U_0$ is generated and saved on GCS 210. Snapshot generator 212 may be executing external to game server 205 as shown in FIG. 2, or may be executing internal to game server 205 as shown in FIG. 1A.

In addition, the information collected from those game plays may be used to generate contextually relevant information provided to user $U_0$ in a corresponding companion application. For example, as previously introduced, companion application generator 213 is configured for implementing a location based companion interface that is configured to support game play of the user $U_0$, wherein the companion interface includes contextually relevant information (e.g., messaging, assistance information, offers of assistance, etc.) that is generated based a location of a character in the game play of user $U_0$. Companion application generator 213 may be executing external to game server 205 as shown in FIG. 2, or may be executing internal to game server 205 as shown in FIG. 1A. In these implementations, the contextually relevant information may be delivered over a network 220 to the user device 231 for display of the companion application interface, including the contextually relevant information. In another embodiment, the companion application generator 213 may be local to the user (e.g., implemented within user device 231) and configured for both generating and displaying the contextually relevant information. In this implementation, the user device 231 may be directly communicating with user device 230 over a local network (or through an external network 220) to implement the companion application interface, wherein the user device 231 may deliver location based information to the user device 231, and wherein device 230 is configured for generating and displaying the companion application interface including the contextually relevant information.

Further, user device 230 is configured to provide an interface that enables the jumping to a selected point in the gaming application using a snapshot generated in the game play of user $U_0$ or another user. For example, jump game executing engine 216 is configured for accessing a corresponding snapshot, instantiate an instance of the gaming application based on the snapshot, and execute the gaming application beginning at a point in the gaming application corresponding to the snapshot. In that manner, the snapshot enables the requesting user to jump into the game play of the corresponding user at the point corresponding to the snapshot. For instance, user $U_0$ is able to experience the game play of any other user, or go back and review and/or replay his or her own game play. That is, a requesting user, via a snapshot of a corresponding game play, plays the gaming application using the characters used in and corresponding to that game play. Jump game executing engine 216 may be executing external to game server 205 as shown in FIG. 2, or may be executing internal to game server 205 as shown in FIG. 1A.

FIGS. 3-8 are described within the context of a user playing a gaming application. In general, the gaming application may be any interactive game that responds to user input. In particular, FIGS. 3-8 describe a location based companion interface that is configured to support game play of a user, wherein the companion interface includes contextually relevant information (e.g., messaging, assistance information, etc.) that is generated based on a location of a character in the game play of the user.

Figure 3:
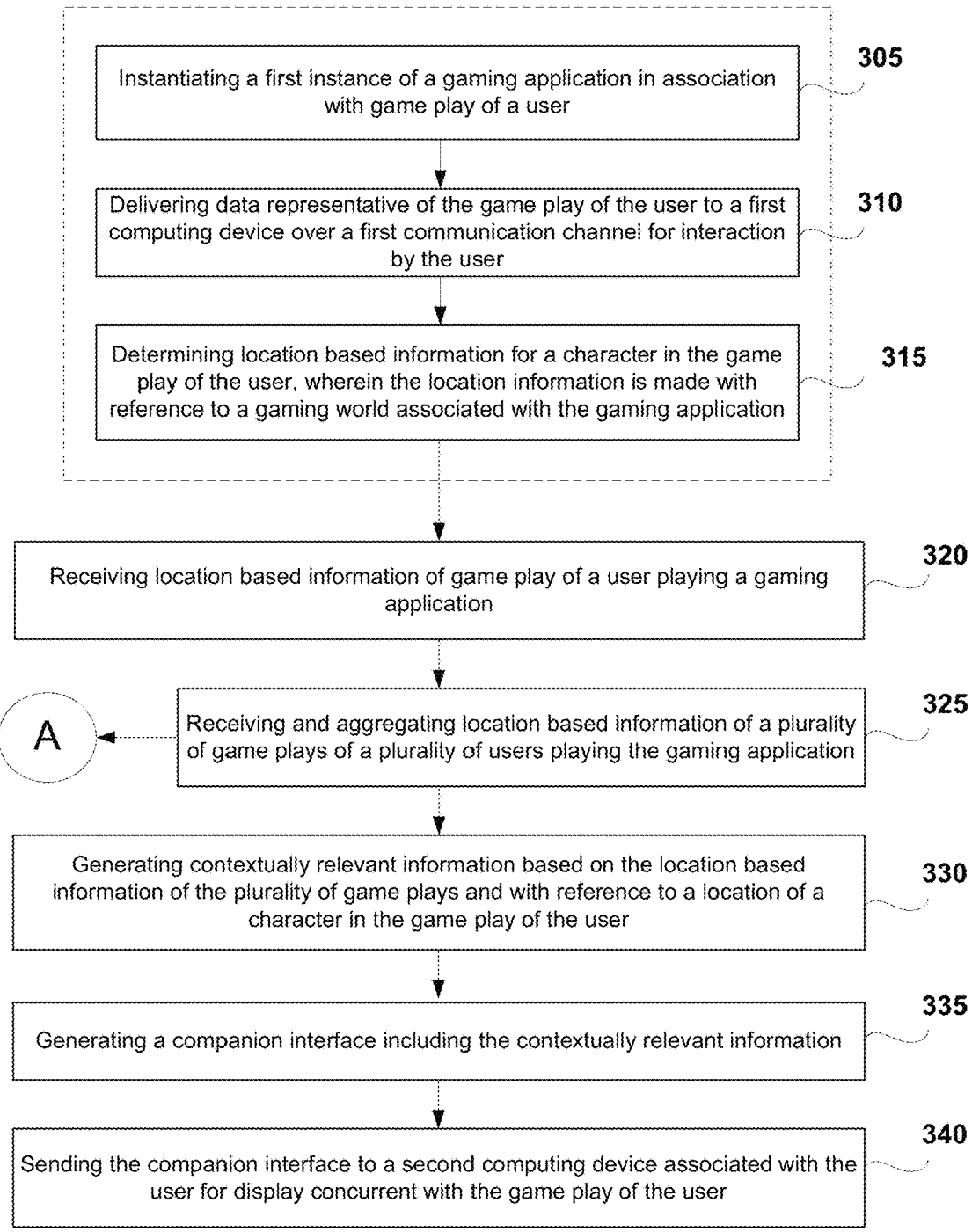
FIG. 3 is a flow diagram illustrating steps in a method for implementing a location based companion interface supporting game play of a corresponding user, in accordance with one embodiment of the present disclosure.

With the detailed description of the various modules of the gaming server and client device communicating over a network, a method for implementing a location based companion interface supporting game play of a corresponding user is now described in relation to flow diagram 300 of FIG. 3, in accordance with one embodiment of the present disclosure. Flow diagram 300 illustrates the process and data flow of operations involved at the game server side for purposes of generating location based information contained within a companion interface that is transmitted over a network for display at a client device of a user, wherein the client device may be separate from another device displaying the game play of the user playing a gaming application. In particular, the method of flow diagram 300 may be performed at least in part by the companion application generator 213 of FIGS. 1 and 2.

Although embodiments of the present invention as disclosed in FIG. 3 are described from the standpoint of the game server side, other embodiments of the present invention are well suited to implementing a location based companion interface within a local user system including a game processor configured for executing a gaming application in support of a game play of a user and configured for generating location based information of the game play, and a companion application generator of another device configured for receiving the location based information over a local network and for displaying contextually relevant information. For example, the companion interface is implemented within a local and isolated system, wherein information from game plays of other users may not necessarily be used for generating the contextually relevant information. In another implementation, information from game plays of other users may be received from a back-end game server over another network and used for generation of the contextually relevant information.

Flow diagram 300 includes operations 305, 310, and 315 for executing a gaming application and generating location based information of game play of a user playing the gaming application. In particular, at operation 305 the method includes instantiating a first instance of a gaming application in association with game play of a user. As previously described, in one embodiment, the instance of the gaming application can be executed locally at a client device of the user. In other embodiments, the instance of the gaming application may be executing at a back-end game executing engine of a back-end game server, wherein the server may be part of a cloud game network or game cloud system. At operation 310, the method includes delivering data representative of the game play of the user to a first computing device over a first communication channel for interaction by the user. The communication channel may be implemented for example through a network, such as the internet. As such, rendered images may be delivered for display at the first computing device, wherein the rendered images are generated by the instance of the gaming application in response to input commands made in association with game play of the user.

At operation 315, the method includes determining location based information for a character in the game play of the user. In particular, the location based information is made with reference to a location of a character in the game play of the user in a gaming world associated with the gaming application. The location based information may be included within snapshots that are generated, captured and/or stored during the game play of the user, as previously described. For example, each snapshot includes metadata and/or information generated with reference to the location of the character. In one embodiment, the metadata and/or information is configured to enable execution of an instance of the gaming application beginning at a point in the gaming application corresponding to the snapshot (e.g., beginning at a jump point corresponding to the state of the game play when the snapshot was captured, which reflects the location of the character in the game play). For instance, the snapshot includes location based information of the game play, and game state data that defines the state of the game play at the corresponding point (e.g., game state data includes game characters, game objects, object attributes, graphic overlays, assets of a character, skill set of the character, history of task accomplishments within the gaming application for the character, current geographic location of the character in the gaming world, progress through the gaming application in the game play of the user, current status of the game play of the character, etc.), such that the game state data allows for generation of the gaming environment that existed at the corresponding point in the game play. The snapshot may include user saved data used to personalize the gaming application for the user, wherein the data may include information to personalize the character (e.g., shape, look, clothing, weaponry, game difficulty, game level, character attributes, etc.) in the game play. The snapshot may also include random seed data that is relevant to the game state, as previously described.

The remaining operations of flow diagram 300 may be performed by a companion application generator, which may be executing locally or a back-end server of a cloud game network, as previously described. In particular, at operation 320, the method includes receiving location based information of game play of a user playing a gaming application. In the case where the gaming application is executed locally at the first computing device, the location based information generated during the game play may be received from the localized, first computing device over a network. For example, the location based information may be generated and stored locally by the first computing device. In the case where the gaming application is executed at a game executing engine operating at a back-end game server of a cloud game network or game cloud system, the location based information generated during the game play may be received from the back-end game server, either internally where the cloud game network is configured for executing the gaming application and generating the companion interface, or externally where the cloud game network is configured for executing the gaming application and another server is generating the companion interface.

At operation 325, the method includes receiving and/or aggregating location based information of a plurality of game plays of a plurality of users playing the gaming application. For example, snapshots may be captured during the game plays of the other users, just as snapshots are captured during the game play of the user, wherein the snapshots include location based information relating to the game plays of the other users, as previously described. The snapshots and/or the location based information contained in those snapshots may be generated locally at user devices, and delivered to a back-end server of a cloud game network or game cloud system, or the snapshots may be generated at the back-end server of the cloud game network which is also executing instances of the gaming application in support of the other game plays. The location based information is also received from the back-end server, either through a local network (where the server acts to execute instances of the gaming application, and to generate the companion application), or through a remote network (where the back-end server of the cloud game network acts independent of the generation of the companion application).

These snapshots, including the metadata/information contained within the snapshots or inferred from the snapshots generated during the game play of other users, may be combined with the location based information (generated during game play of user) to provide additional information relating to the game play of the user. For example, the location based information generated during game play of the user can be used to determine where the character has been in the game play, what tasks the character has accomplished in the game play, the current assets and skills of the character, where the character currently is located (e.g., in the gaming world), etc. Combining and analyzing the location based information generated during game play of the user with metadata/information contained within the snapshots or inferred from the snapshots generated during the game play of other users, it may be statistically determined (e.g., as determined through a prediction engine) what actions/assets are necessary to advance the game play of the user, such as where the character in the game play will be going, what tasks are upcoming and/or required to advance the game play, and what assets or skills are needed by the character to accomplish those tasks, etc.

At operation 330, the method includes generating contextually relevant information for the location of the character, wherein the contextually relevant information is generated in real-time based on the location based information of the plurality of game plays, including the game play of the user. In some implementations, based on statistical predictions as described above, the contextually relevant information may provide assistance in progressing and/or advancing through the gaming application, in embodiments.

For example, the contextually relevant information may be provided in the form of messages, wherein the messages may be used to provide helpful information advancing game play (e.g., steps that guide the user to accomplish a required task, notification of what is coming up, or). In one implementation, a train of related messages is generated depending on location and/or movement of a character within the gaming world, such as generating step-by-step instructions providing chunk sized instructions that are part of a larger instruction set, each chunk being delivered when the character reaches a corresponding location. In particular, a task may be statistically predicted, wherein the task is required to advance the game play of the user. One or more solutions to accomplishing the task may be determined. These solutions are determined from the previously collected information (e.g., snapshots) of the plurality of game plays of other users, which may provide insight on future game play of the user. For example, the collected information may show that that the aforementioned task is typically addressed in other game plays by other users at the same point in the game play, and that those users found one or more solutions to complete that task. Those solutions may include assets that are required to accomplish those tasks. Further, the collected information that is analyzed may be further filtered by the user. For example, the user may be interested in solutions from all game plays (e.g., by default), from game plays of noted experts, from one or more selected game plays of friends of the user, etc.

The message may include offers for assistance, such as tips from experts or friends or third parties, or a link that opens a 2-way interactive communication allowing a friend or expert to guide the user in his or her game play, etc. In some embodiments, the message includes an offer to play the gaming application for the user in a jump game to accomplish a task, as will be described further in relation to FIG. 6. In some embodiments, the message is generated in response to a trigger, such as recognizing the inability of the user to advance through a certain point in the gaming application. In other examples, the contextually relevant information may include offers to receive or purchase downloadable content (DLC) that is needed by the user to accomplish upcoming tasks to be completed in order to advance the game play.

In still other embodiments, the contextually relevant information may be originally generated by the user. For example, the message may be intended for broadcast to other users (e.g., help flag), and includes a request for assistance from other players of the gaming application. Further, the message including the request for assistance may be targeted to friends of the user, or delivered to known experts, or third parties that provide gaming assistance—wherein the friends, experts, and third parties may or may not be simultaneously playing the gaming application. In other implementations, the message may also include an offer to open 2-way communication with the user that is generated by the user, and may be targeted to friends of the user. In still other implementations, the message includes an offer to open 2-way communications with another user, wherein the message is generated by the other user.

For illustration, a broadcast message may be generated in response to receiving a request for help from the user, wherein the user may be at an impasse in advancing his or her game play. The message may be received by the back-end server (e.g., server executing the companion application generator 213). For example, a beacon and/or flag associated with the request for help may be broadcast across one or more companion interfaces of one or more friends of the user that are playing the gaming application. The beacons may be inserted into the one or more radar mappings showing the gaming world in the one or more user interfaces, each beacon located at a point corresponding to the location of the character of the user in the gaming world. The back-end server may receive an acceptance of the request, wherein the acceptance could be generated by a friend of the user. In one embodiment, data representative of the game play of the user is streamed to a third computing device associated with the friend. That is, the game play of the user may be streamed to the friend via a corresponding companion interface. Further, a two-way communication session (e.g., messaging via companion interfaces, voice, etc.) may be established so that the user and the friend may communicate. In that manner, the friend may help provide guidance in real time as the user is playing the gaming application.

In other implementations, the contextually relevant information may also provide other types of information provided to increase the user experience. The information may be related to the game play of the user, such as generally being helpful, supporting, interesting, or the like. For example, the information may provide locations of other users playing the gaming application (e.g., where characters of other users are located within a radar mapping of the gaming world) especially those that are in the vicinity of the character of the user. The contextually relevant information may include navigation pointers, interesting game features and their locations, icons or links to other features (e.g., snapshots, jump game instantiations, etc.).

Figure 4A:
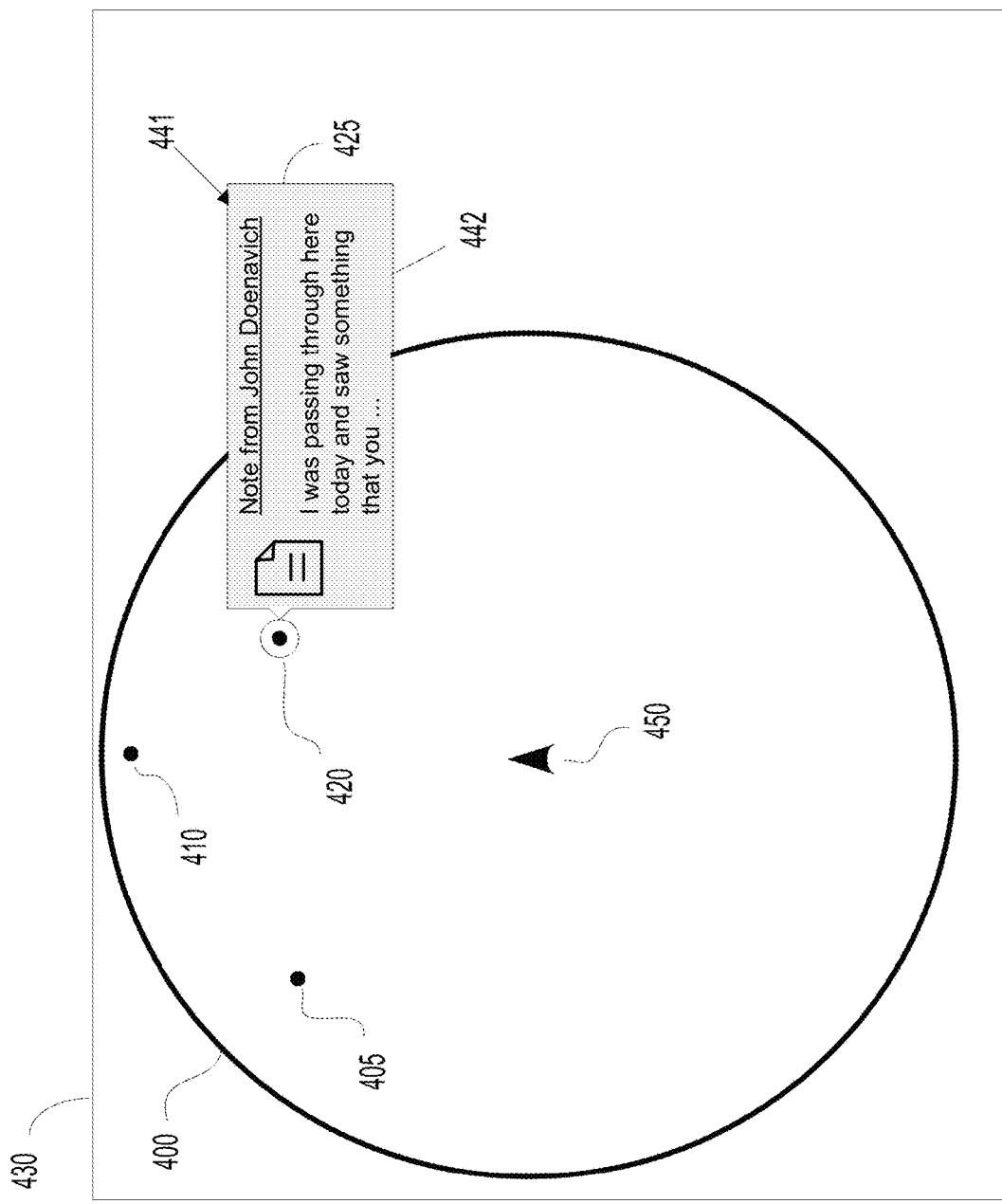
FIG. 4A illustrates a mapping of a game play of a user playing a gaming application, wherein the mapping indicates a second user (e.g., a friend of the user) is in the general vicinity of a location of a character in the game play of the user, wherein the second user has a message relating to the game play of the user, in accordance with one embodiment of the present disclosure.
Figure 4B:
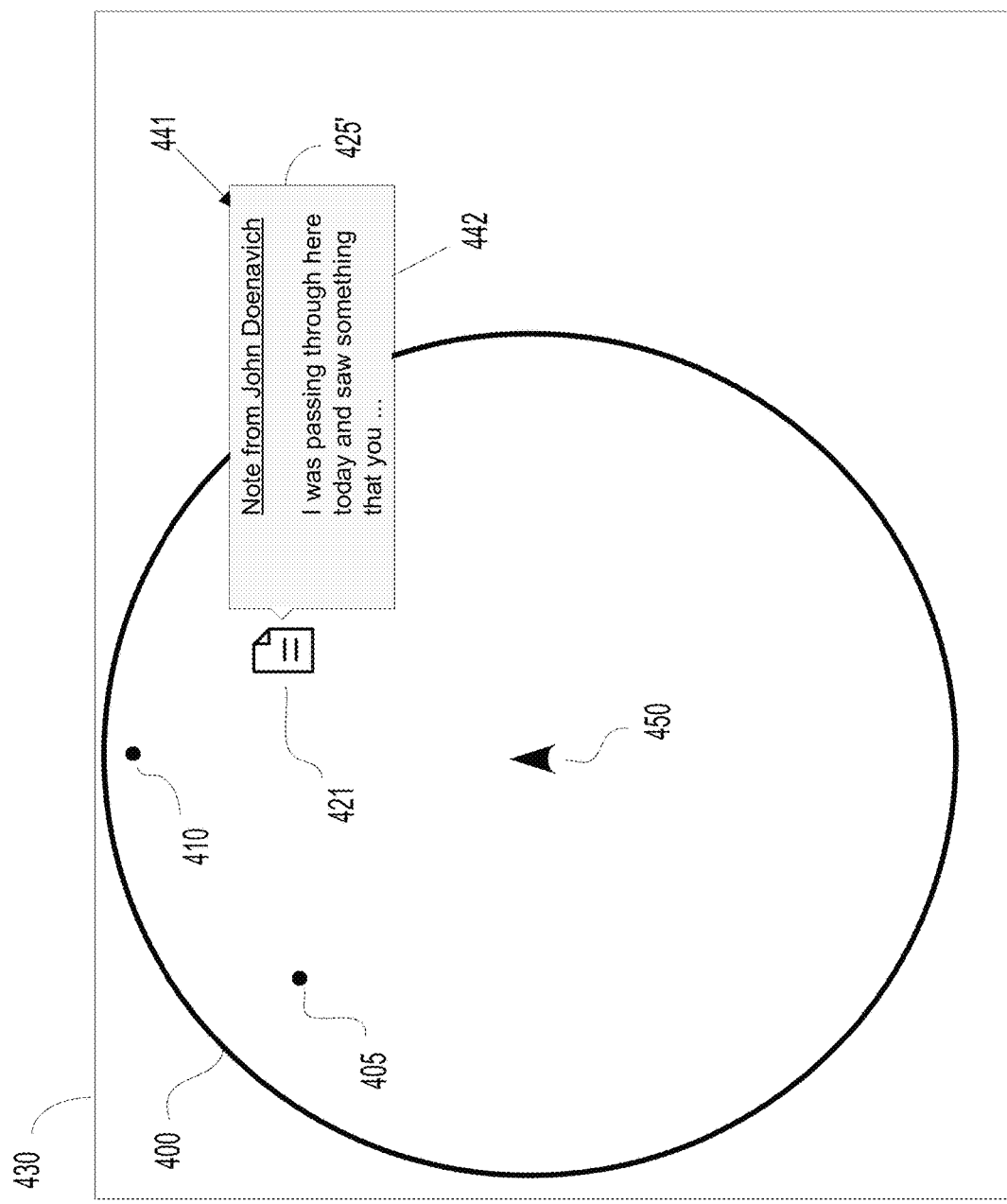
FIG. 4B illustrates the mapping of the game play of the user introduced in FIG. 4A and includes a location based message left by the second user, wherein the message relates to the game play of the user, in accordance with one embodiment of the present disclosure.
Figure 4C:
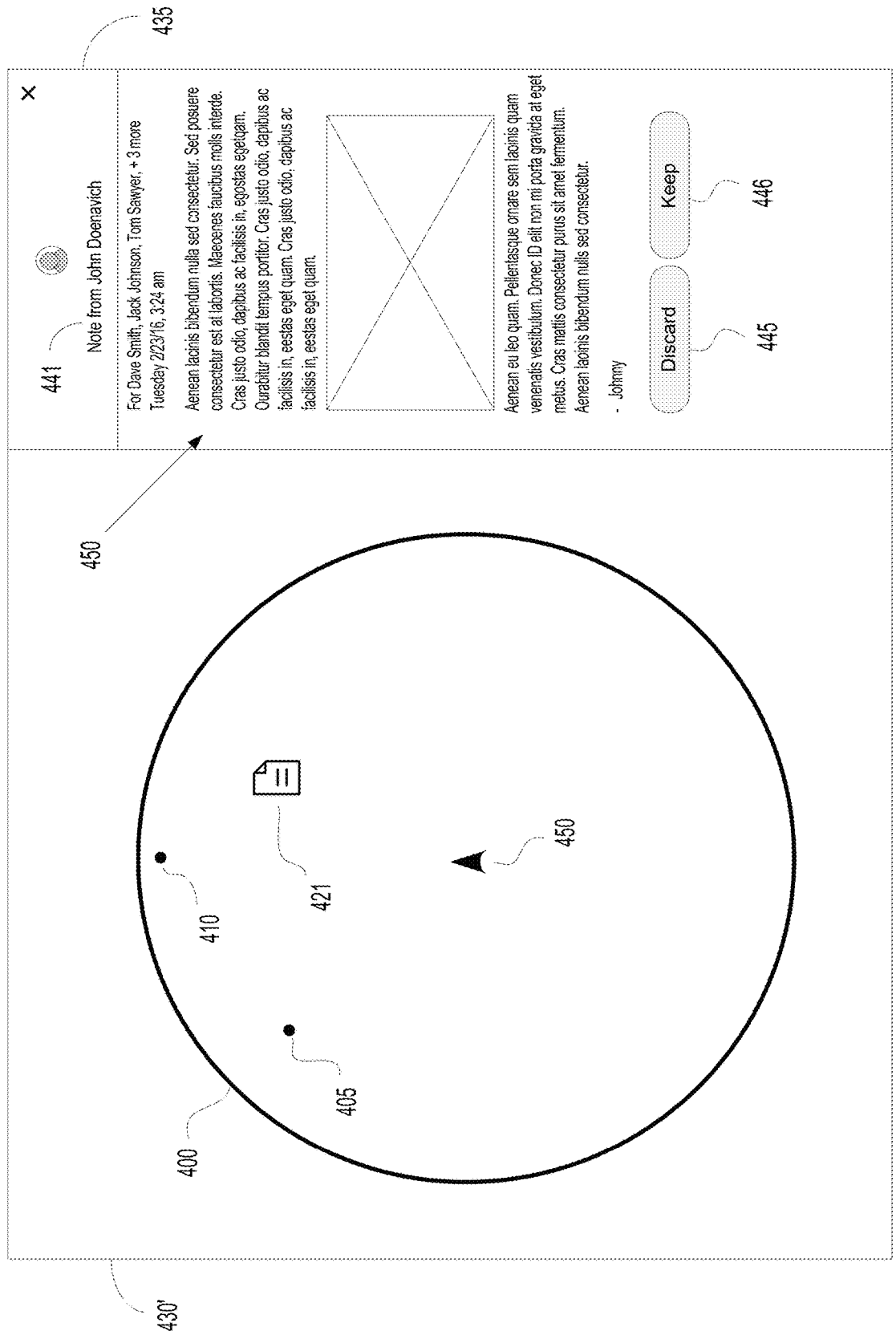
FIG. 4C illustrates the mapping of the game play of the user introduced in FIGS. 4A and 4B, and includes a window displaying the location based message left by the second user, in accordance with one embodiment of the present disclosure.

In still other implementations, the contextually relevant information may include messages from other users (e.g., egg drops containing information or statements from friends of the user, to include taunting statements, words of encouragement, etc.). For illustration, a predefined event may be detected within the game play of the user. The predefined event may include a character reaching a location within a gaming world. Upon detection, a previously generated message from a friend of the user may be accessed. That message may be delivered to the user as contextually relevant information. For example, the message may include a taunt from the friend (e.g., "Ha Ha. I thought you would never get here!"). As another example, the message may include encouraging words from the friend (e.g., "Congratulations, you finally made it! It took me forever to get here. Get through the next section quick, and see you (in the game) on the flip side."). For example, FIGS. 4A-4C illustrate messages generated by a friend and delivered in a companion interface of a user playing a gaming application, as will be described below.

At 330, the method includes generating a companion interface including the contextually relevant information that is based on the location based information from the plurality of game plays (e.g., snapshot information) and from the game play of the user, and wherein the information is generated based with reference to a location of a character in the game play of the user (e.g., location based contextually relevant information). That is, generally the companion interface provides features in support of the game play of the user, and enables the user, or any other viewer, to access information in real time that is generally helpful to user while playing the gaming application.

For example, in one embodiment, the companion interface includes a radar mapping that shows at least a portion of the gaming world of the gaming application, wherein the radar mapping includes at least objects/features located within the gaming world, and locations of characters of the user and other players. Additional information may also be included within or adjacent to the radar mapping, such as messaging that provides general information to increase the experience of the user, or a solution to accomplish a predicted task necessary to advance the game play of the user. In the example previously introduced, wherein a solution is statistically predicted and selected for presentation to the user in the companion interface, At least one of the solutions may be selected for presentation to the user as contextually relevant information, wherein that solution may include a sequence of steps necessary to accomplish that task. The sequence of steps may be further associated with locations and/or actions in the game play of the user, such that a first step may be associated with a combination of a first location/first action, a second step may be associated with a combination of a second location/second action, etc. Each of the steps in the solution may further be associated with a corresponding message, wherein each of messages may be presented in the companion application depending on the displayed location and/or actions of a character in the game play of the user. For example, a first step in the sequence may be presented in a first message in the companion interface. As an illustration, the first step may include assets required by a character to accomplish that task, and instructions for obtaining those assets. The method includes determining that the first step was completed within the game play of the user, wherein the completion may be further associated with a first location of the character, and/or a first action taken by the character. At this point, a second step in the sequence may be presented in a second message in the companion interface.

At 340, the method includes sending the companion interface to a second computing device associated with the user for display concurrent with the game play of the user. For example, in one embodiment there may be two communication channels delivering information, such as a first communication channel established to deliver data representative of game play of the user to the first computing device, and a second communication channel established to deliver data associated with the companion interface (e.g., providing for delivery of interface, and input commands controlling the interface). In another embodiment, the companion interface may be delivered along with the data representative of game play of the user, such as through a split screen including a first screen showing the game play and a second screen showing the companion interface. More particularly, the companion interface is generated in real time, and delivered concurrent with the game play of the user, such that the information provided through the interface supports the game play of the user. In that manner, the game play of the user may be augmented with the information provided by the companion interface.

FIGS. 4A-4C illustrate a message generated by a friend and delivered in a companion interface of a user playing a gaming application, as previously introduced. The message may be provided within a mapping 400 (e.g., radar mapping) showing the location of a character of the user within a gaming world of the gaming application. The message may be presented in response to an event trigger (e.g., character of user reaching a particular location in the gaming world). In each of the radar mappings 400 shown in FIGS. 4A-4C, a directional pointer 450 represents the location of the character within the gaming world, and is placed at the center of the radar mapping 400. Further, the directional pointer 450 also gives an orientation of the character (e.g., viewpoint of the character within the gaming world).

In particular, FIG. 4A illustrates a mapping 400 of a game play of a user playing a gaming application, wherein the mapping 400 indicates that a character of a second user (e.g., a friend of the user) is in the general vicinity of a location of a character in the game play of the user. The mapping 400 may be provided within window 430 in FIG. 4A. The second user is represented by icon 420, which indicates the location of the second user within the gaming world. Other characters 405 and 410 of other users are also in the general vicinity shown by mapping 400. In addition, a message 450 may be associated with the second user, wherein the message is related to the game play of the user. The message may be presented in a selection window 425 along with icon 420. The selection window may have a heading 441 (e.g., "Note from John Doenavich") that indicates the message is available from another player of the gaming application. The selection window 425 may include a preview 442 of the message 450. In that manner, the user is made aware that a message 450 is available for selection from another player of the gaming application, John Doenavich, wherein John may be a friend of the user.

In another embodiment, the character of the other user need not be in the vicinity of the character of the user. In that case, the message 450 may be presented in the form of an egg-drop. In particular, FIG. 4B illustrates the mapping 400 of the game play of the user introduced in FIG. 4B and includes a location based message 450 left by the second user, John Doenavich, wherein the message 450 relates to the game play of the user, in accordance with one embodiment of the present disclosure. As shown, mapping 400 presented in window 430 includes a message icon 421. The location of message icon 421 within mapping 400 may indicate the location of a character in the gaming world associated with the game play of John Doenavich at the time when the message 450 was created. The message may be presented in a selection window 425' along with icon 421, wherein selection window 425' is similar to selection 425 presented in FIG. 4A. The selection window may have the same heading 441 (e.g., "Note from John Doenavich") that indicates the message is available from another player of the gaming application. The selection window 425' may include the same preview 442 of the message 450. In that manner, the user is made aware that the message 450 is available for selection from another player of the gaming application, John Doenavich, wherein John may be a friend of the user.

FIG. 4C illustrates the mapping 400 of the game play of the user introduced in FIGS. 4A and 4B, and includes a window 435 displaying the location based message 450 left by the other player (e.g., John Doenavich), in accordance with one embodiment of the present disclosure. In a split screen, window 430' includes mapping 400 which includes icon 421 after the user actuated selection window 425', in the case where a character of the other player is not in the vicinity of the character played by the user and represented by directional pointer 450. In relation to FIG. 4A, icon 421 may be replaced with character icon 420, previously introduced in FIG. 4A, when a character of the other player is in the vicinity of the character played by the user. More particularly, window 435 shows heading 441, and also includes the full body of message 450. Also, icons 445 and 446 allow the user to save or discard the message 450.

FIGS. 5A-5E illustrate a companion interface 590 of a user playing a gaming application, wherein the companion interface facilitates two-way communication between two or more players of the gaming application, in accordance with one embodiment of the present disclosure. The opportunity to instantiate and continue two-way communication may be provided within a mapping 500 (e.g., radar mapping) showing the location of a character of the user within a gaming world of the gaming application. In each of the radar mappings 500 shown in FIGS. 5A-4E, a directional pointer 550 represents the location of the character within the gaming world, and is placed at the center of the radar mapping 500. Further, the directional pointer 550 also gives an orientation of the character (e.g., viewpoint of the character within the gaming world).

Figure 5A:
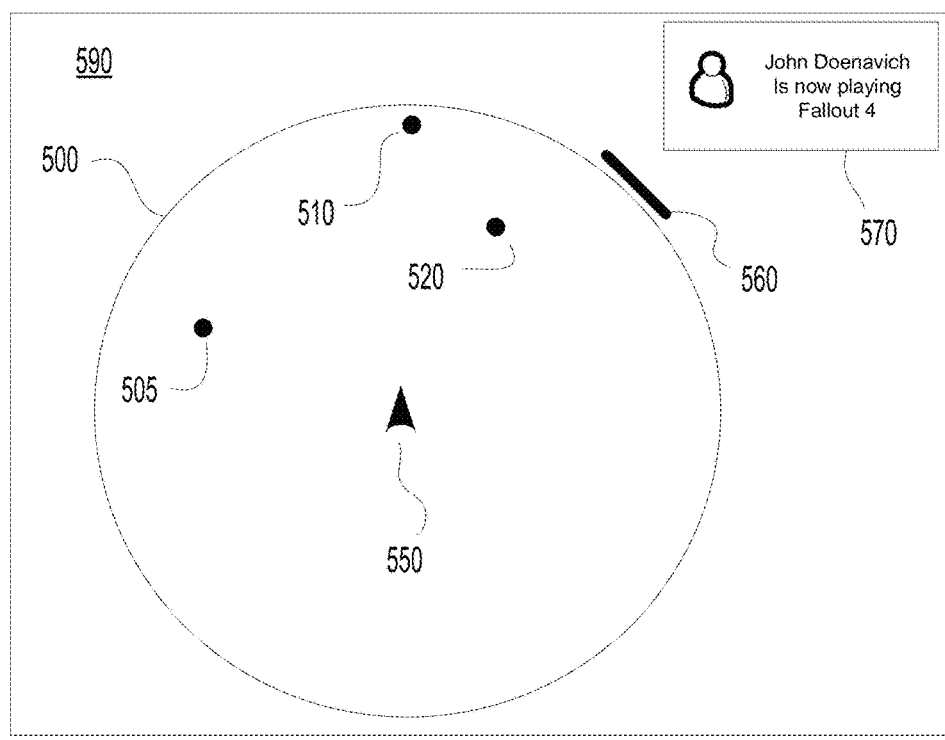
FIG. 5A illustrates a mapping of the game play of a user playing a gaming application, wherein the mapping indicates a second user is approaching the area defined by the mapping, in accordance with one embodiment of the present disclosure.

In particular, FIG. 5A illustrates a mapping 500 of the game play of a user playing a gaming application, wherein the mapping indicates another player (e.g., John Doenavich first introduced in the example of FIGS. 4A-4C) is currently playing the gaming application, in accordance with one embodiment of the present disclosure. The mapping may be shown within window 530 in FIG. 5A. Arc 560 is located outside the area defined by mapping 500, wherein arc 560 shows the general direction of a character of the other player in the gaming world with respect to the location of the character of the user represented by direction arrow 550 at the center of mapping 500. Arc 560 is outside of mapping 500 to indicate that the character of the other player is not within the general vicinity of the character of the user (indicated by the interior of mapping 500), but is now playing the gaming application. Other characters 505, 510, and 520 are shown as being in the general vicinity of the character of user (represented by interior of mapping 500). An information window 570 is also provided within companion interface 590, and notifies the user that the other player, John Doenavich, is playing the gaming application.

Figure 5B:
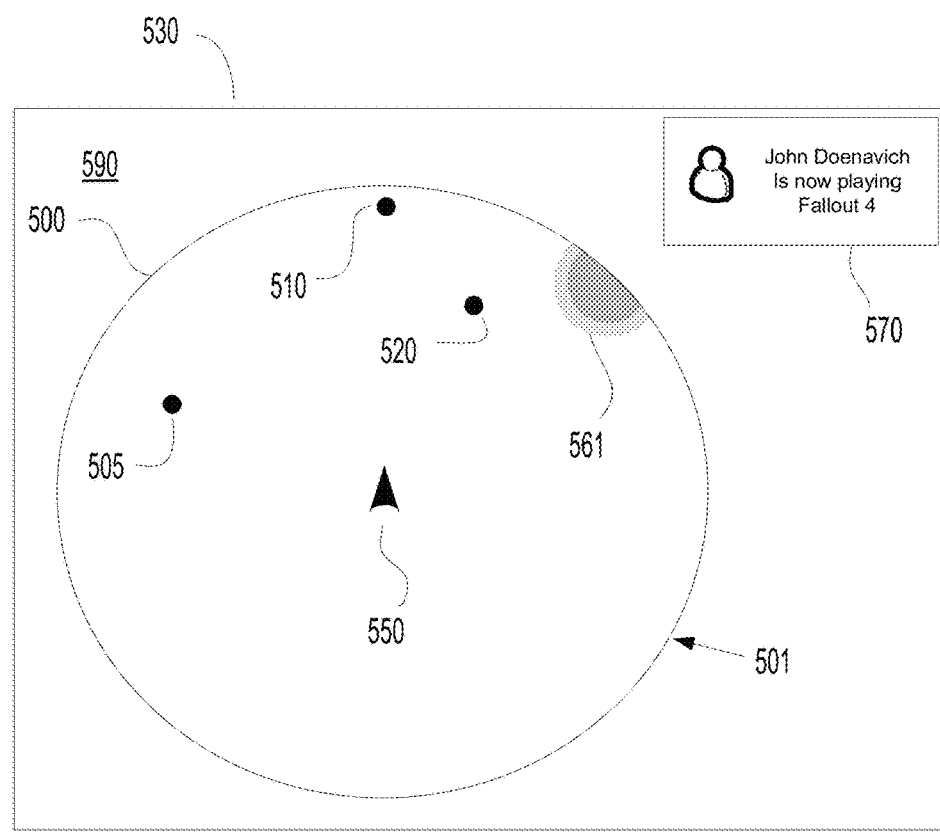
FIG. 5B illustrates the mapping of the game play of the user introduced in FIG. 5A, wherein the mapping indicates that the second user is approaching the general vicinity of a location of a character in the game play of the user, such that the second user is approaching the outer boundary of the mapping, in accordance with one embodiment of the present disclosure.

FIG. 5B illustrates the mapping 500 of the game play of the user introduced in FIG. 5A, wherein the mapping indicates that the other player is approaching the general vicinity of a location of a character in the game play of the user, wherein the general vicinity is defined by the interior of mapping 500, in accordance with one embodiment of the present disclosure. Window 350 including mapping 500 is updated to show that the character of the other player is approaching the outer boundary 501 of mapping 500, but has not breached the boundary. In particular, icon 561 is shown adjacent to the boundary 501, in a position within mapping 500 that shows the general direction the character of the other player is approaching the general vicinity with reference to the location of the character of the user indicated by directional pointer 550 located in the center of mapping 500. Icon 561 may represent a sphere of influence (e.g., represented by a 2D circle within mapping 500) that is centered at the location of the character of the other player within the gaming world. Icon 561 is shown as a half-circle because the character of the other player is still outside of the area defined by mapping 500. As that character moves closer and closer to the general vicinity defined by mapping 500, icon 561 may get larger or darker within mapping 500 and begin to complete a full circle as shown in mapping 500.

Figure 5C:
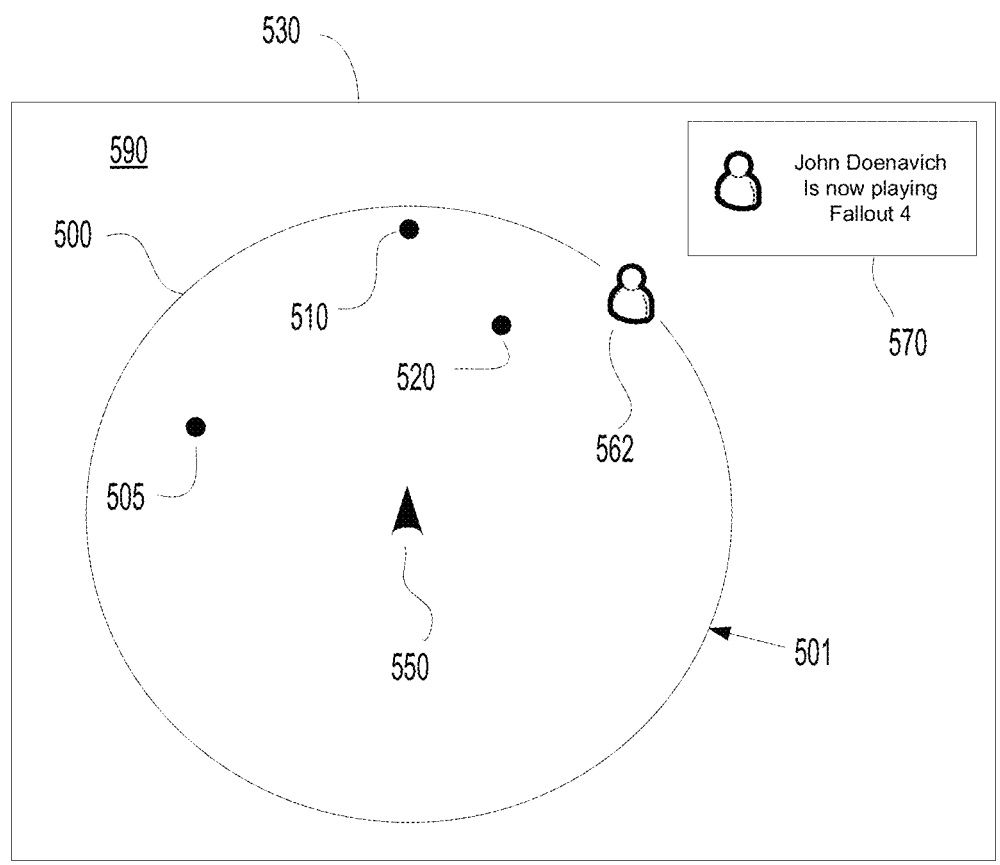
FIG. 5C illustrates the mapping of the game play of the user introduced in FIGS. 5A-5B, wherein the mapping indicates that the second user has now reached the outer boundary of the mapping, in accordance with one embodiment of the present disclosure.

FIG. 5C illustrates the mapping 500 of the game play of the user introduced in FIGS. 5A-5B, wherein the mapping indicates that the other player has now reached the outer boundary 501 of the mapping, in accordance with one embodiment of the present disclosure. Window 350 including mapping 500 is updated to show that the character of the second player is now considered to be within the general vicinity of the character of the user, or within mapping 500. Because the focus of the companion interface 590 illustrated in FIGS. 5A-5E is to open communication between the user and another player of the gaming application, icon 562 represents a human (e.g., John Doenavich as the other player), and not necessarily a character within the gaming application played by the other player.

Figure 5D:
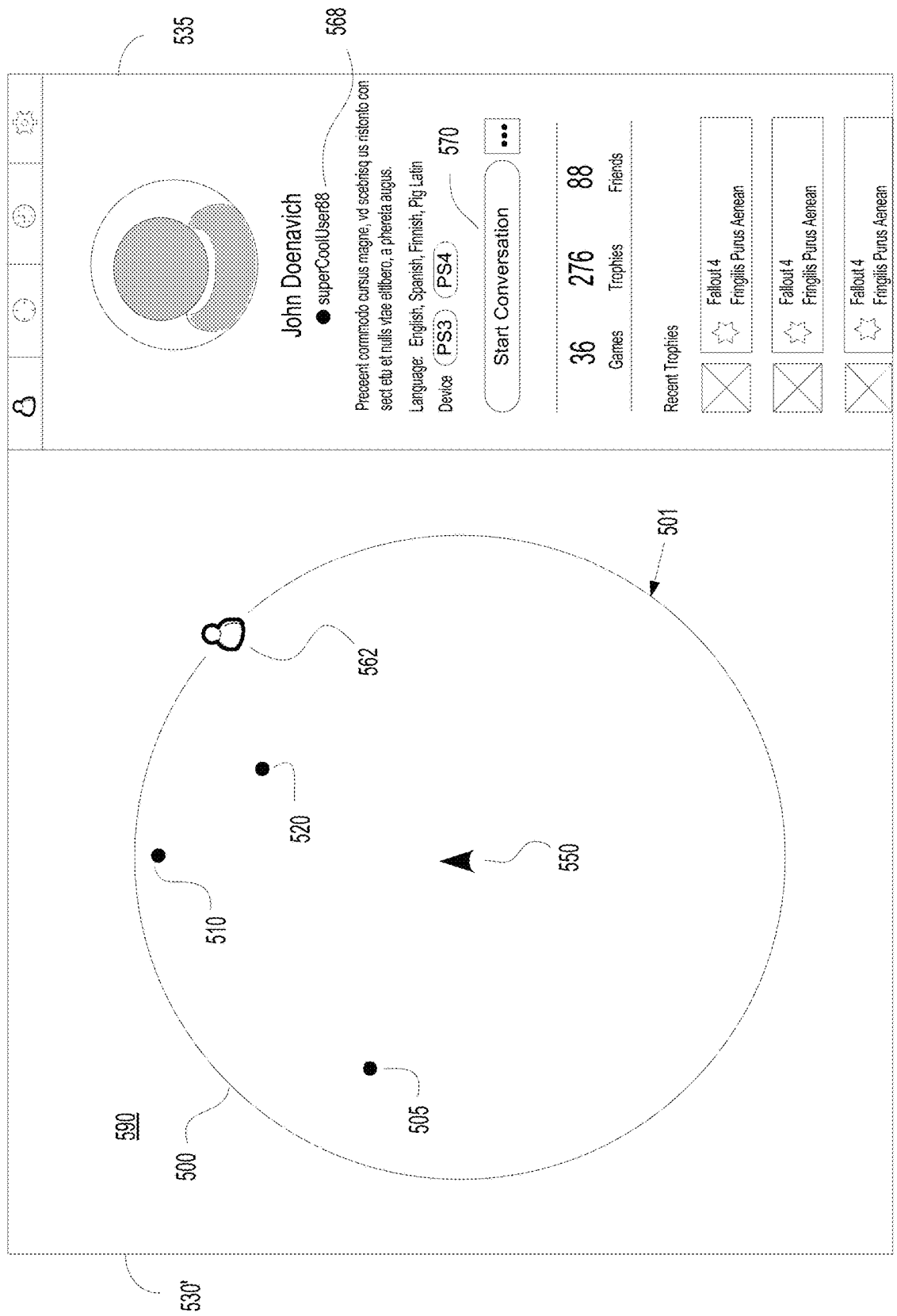
FIG. 5D illustrates the mapping of the game play of the user introduced in FIGS. 5A-5C, and includes a window displaying information about the second user, wherein the window includes an invitation to join a conversation with the second user, in accordance with one embodiment of the present disclosure.

FIG. 5D illustrates the mapping 500 of the game play of the user introduced in FIGS. 5A-5C, and includes a window 535 displaying information about the other player, in accordance with one embodiment of the present disclosure. In a split screen, window 530' includes mapping 500 which includes icon 562 located at the outer boundary 501. Basically, mapping 500 is identical in both FIGS. 5C and 5D. In addition, window 535 shows information about John Doenavich, the other player, and includes the username 568 ("superCooluser88"), the game consoles available to the other user (e.g., SONY PS3 and SONY PS4), languages spoken by the other player, etc. Importantly, window 535 includes an invitation to join a conversation with the other player, John Doenavich, wherein the invitation is presented within a selection icon 570, which when enabled instantiates two-way communication between the user and the other player.

Figure 5E:
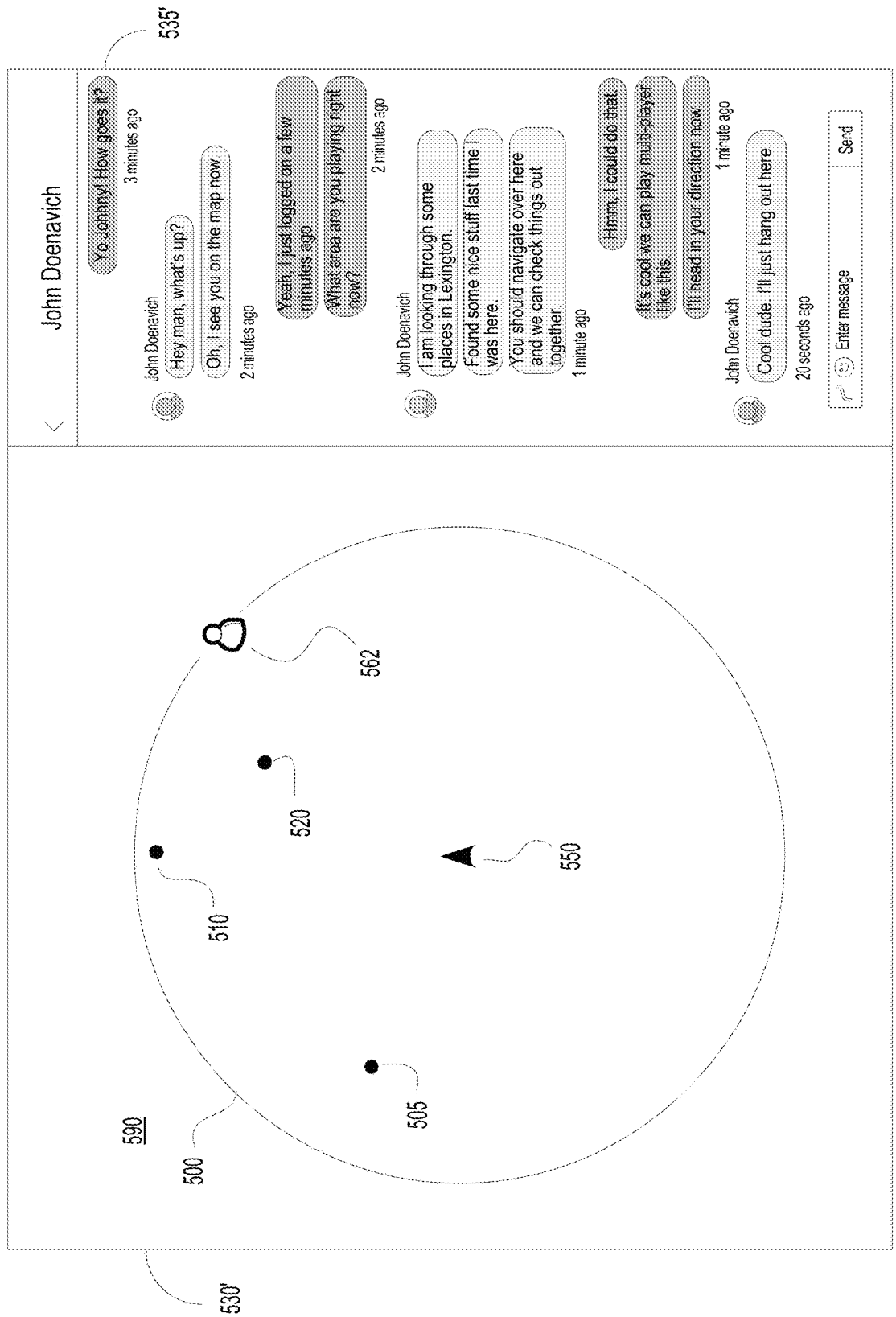
FIG. 5E illustrates the mapping 500 of the game play of the user introduced in FIGS. 5A-5D, and includes a window 535' displaying a two-way conversation between the user and the other player, in accordance with one embodiment of the present disclosure.

FIG. 5E illustrates the mapping 500 of the game play of the user introduced in FIGS. 5A-5D, and includes a window 535' displaying a two-way conversation between the user and the other player, John Doenavich, in accordance with one embodiment of the present disclosure. In a split screen, window 530' includes mapping 500 which includes icon 562 located at the outer boundary 501. The mapping 500 shown in FIG. 5E is similar to the mappings 500 shown in FIGS. 5C and 5D, but may be updated depending on the duration of time taken during the conversation between user and the other player shown in FIG. 5E. In particular, window 535' shows the textual entries made during the running conversation between user and the other player, John Doenavich. In the conversation, the user and the other player are trying to bring both of their characters together within the gaming world.

Figure 6:
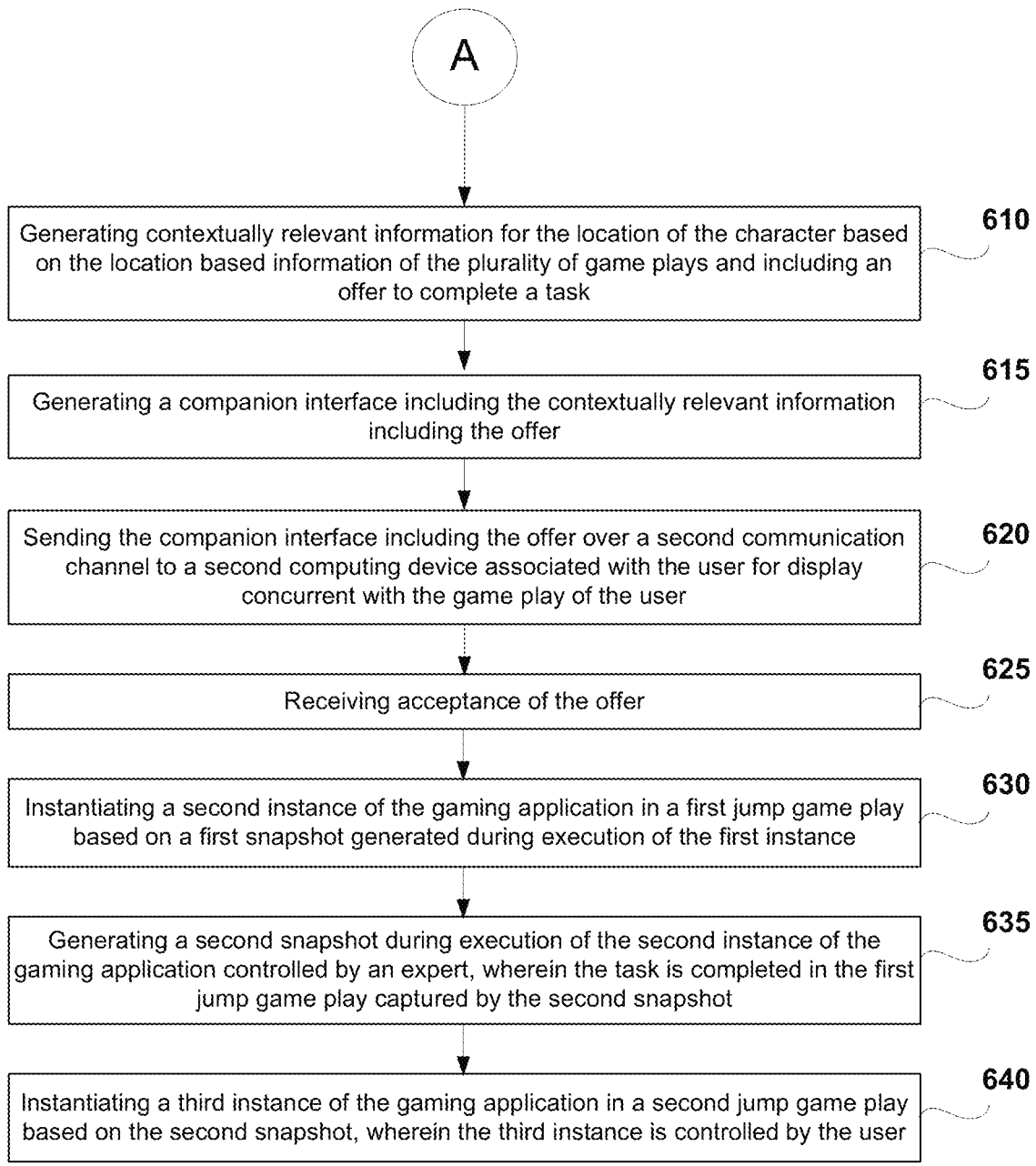
FIG. 6 is a flow diagram illustrating steps in a method for implementing a location based companion interface supporting game play of a corresponding user, wherein the companion interface includes an offer to provide assistance advancing the game play, in accordance with one embodiment of the present disclosure.

With the detailed description of the various modules of the gaming server and client device communicating over a network, another method for implementing a location based companion interface supporting game play of a corresponding user, wherein the companion interface includes an offer to provide assistance advancing the game play, is now described in relation to flow diagram 600 of FIG. 6, in accordance with one embodiment of the present disclosure. Flow diagram 300 illustrates the process and data flow of operations involved at the game server side for purposes of generating location based information contained within a companion interface that is transmitted over a network for display at a client device of a user, wherein the client device may be separate from another device displaying the game play of the user playing a gaming application. In particular, the method of flow diagram 300 may be performed at least in part by the companion application generator 213 of FIGS. 1 and 2.

At 610, the method includes generating contextually relevant information for the location of a character in the game play of a user playing a gaming application. For example, an instance of the gaming application may be executed in association with the game play of the user, wherein data representative of the game play is delivered to a first computing device of the user. The data is delivered over a first communication channel for interaction by the user. Location based information for the character may be generated and captured, for example included within snapshots, wherein the location information is made with reference to a gaming world associated with the gaming application. As previously described, each snapshot also includes information (e.g., metadata, game state data) that enables the generation of an environment corresponding to point in the video game, such that based on the snapshot, the corresponding scene and environment can be generated in another instance of the gaming application. That is, a jump game is executed beginning at a point in the gaming application corresponding to a jump point corresponding to the state of the game play when the corresponding snapshot was captured.

In addition, location based information of a plurality of game plays of other users playing the gaming application is also generated, received, and/or captured. That is, snapshots captured during the game plays of the other users include location based information relating to those game plays, such as metadata/information, game state, etc. For example, a plurality of snapshots may be generated from a plurality of instances of the gaming application executed in association with a plurality of users. As each instance of the video game is being executed, one or more snapshots are captured, wherein a snapshot enables execution of an instance of the video game beginning from a point in the video game corresponding to that snapshot, as previously described. The location based information collected from the plurality of game plays, including the game play of the user, may be analyzed to determine additional contextually relevant information relating to the game play of the user, as previously described. For example, by combining and analyzing the location based information generated during game play of the user with metadata/information contained within snapshots of the plurality of game plays of the other players, it may be statistically determined through a prediction engine what actions/assets are necessary to advance the game play of the user. This contextually relevant information is generated in real-time, for example, in order to provide real-time assistance to the user that progresses and/or advances his or her game play when playing the gaming application.

In one embodiment, within the method a task is determined to be completed within the game play of the user. In addition, a solution that is configured to complete the task is also determined based on the metadata/information collected and analyzed in the game plays of the other players, and is also based on the location of a character in the game play of the user, as previously described. For example, the solution may include a sequence of steps to be performed by a character or user as inputs within the game play.

At 615, the method includes generating a companion interface that includes the contextually relevant information. The companion interface provides features in support of the game play of the user, and enables the user, or any other viewer, to access information in real-time. In one embodiment, the companion interface includes an offer to complete the task, previously introduced, wherein completion of the task may be necessary to advance the game play of the user.

At 620, method includes sending the companion interface to a second computing device associated with the user for display concurrent with the game play of the user. For example, there may be a first communication channel established to deliver data representative of game play of the user to a first computing device, and a second communication channel established to deliver data associated with the companion interface (e.g., providing for delivery of interface, and input commands controlling the interface). In that manner, the game play of the user may be augmented with the information provided by the companion interface.

At 625, the method includes receiving acceptance of the offer. For example, the user may be frustrated with the progress of his or her game play, which may reflect an inability to proceed past a certain point in the gaming application, despite repeated efforts. Rather than taking the drastic measure of quitting the game, which is a known problem for certain players playing any gaming application, a user may elect to receive expert assistance that is provided in the offer, wherein the assistance may include having an expert complete the task for the user. In particular, at 630, the method includes instantiating a second instance of the gaming application in a jump game play based on a first snapshot generated during execution of the first instance of the game play of the user. In particular, the first snapshot includes first game state of the first instance and the location based information for a character in the game play of the user. The first jump game play begins from a point in the gaming application corresponding to the first snapshot, such that game state data in the snapshot enables the generation of an environment, including character generation and random seed data, corresponding to point in the gaming application, such that the gaming application is executed beginning at a point (now identified as a jump point) in the gaming application corresponding to the snapshot.

In that manner, an expert is able to jump into the game play of the user. For instance, the expert is able to instruct the character used in the game play of the user in the jump game, and complete the task in the jump game play. In addition, at 635 the method includes generating and/or capturing a second snapshot during execution of the second instance of the gaming application (executing the jump game) and includes second game state of the second instance, wherein the second instance is controlled by an expert, and wherein the task is completed in the jump game play as captured in the second snapshot. At this point, the second snapshot associated with the jump game play may be made available to the user. Upon selection of the second snapshot, at 640, the method includes instantiating a third instance of the gaming application in a second jump game play based on the second snapshot. The third instance is controlled by the user, wherein the task is completed in the second jump game play. In that manner, the user is able to continue his or her game play as executed by the third instance of the gaming application, wherein now the game play includes completion of the task.

While specific embodiments have been provided to demonstrate the generation and implementation of a location based companion interface that is configured to support game play of a user, wherein the companion interface includes contextually relevant information (e.g., messaging, assistance information, offers of assistance, etc.) that is generated based on a location of a character in the game play of the user, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the embodiments described herein may be executed on any type of client device. In some embodiments, the client device is a head mounted display (HMD).

Figure 7:
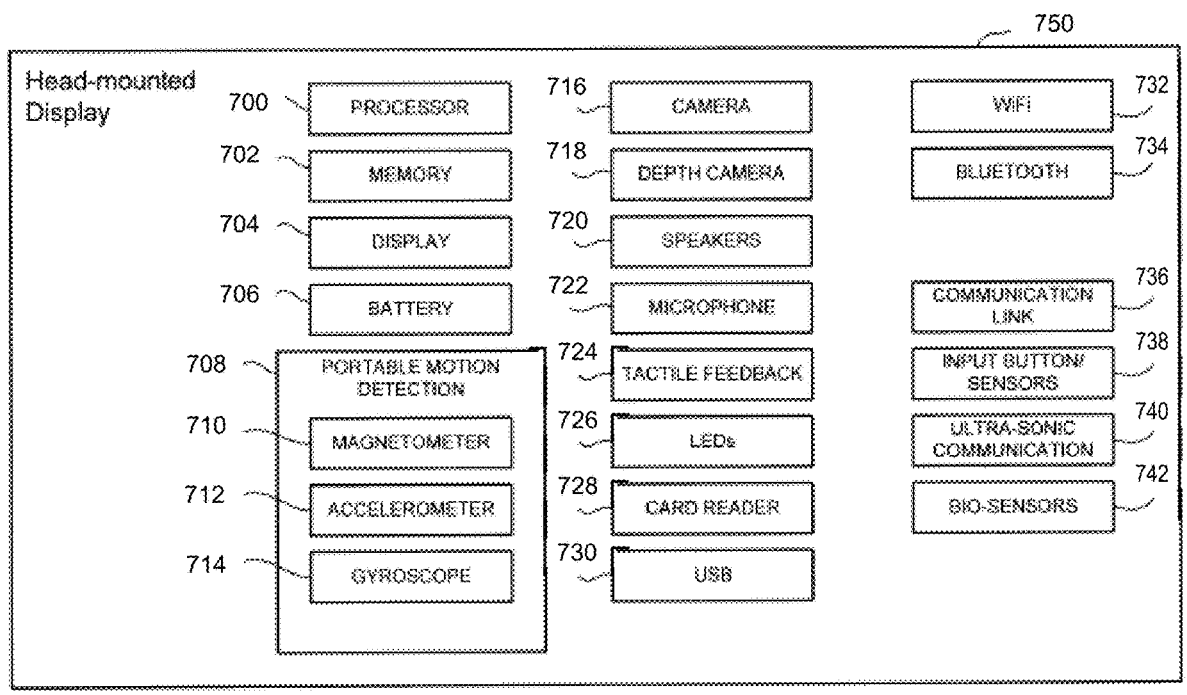
FIG. 7 is a diagram illustrating components of a head-mounted display is shown, in accordance with an embodiment of the disclosure.

FIG. 7, a diagram illustrating components of a head-mounted display 750 is shown, in accordance with an embodiment of the disclosure. The head-mounted display 750 includes a processor 700 for executing program instructions. A memory 702 is provided for storage purposes, and may include both volatile and non-volatile memory. A display 704 is included which provides a visual interface that a user may view. A battery 706 is provided as a power source for the head-mounted display 750. A motion detection module 708 may include any of various kinds of motion sensitive hardware, such as a magnetometer 710, an accelerometer 712, and a gyroscope 714.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 712 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 710 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 712 is used together with magnetometer 710 to obtain the inclination and azimuth of the head-mounted display 750.

A gyroscope is a device for measuring or maintaining orientation, based on the principles of angular momentum. In one embodiment, three gyroscopes 714 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 716 is provided for capturing images and image streams of a real environment. More than one camera may be included in the head-mounted display 750, including a camera that is rear-facing (directed away from a user when the user is viewing the display of the head-mounted display 750), and a camera that is front-facing (directed towards the user when the user is viewing the display of the head-mounted display 750). Additionally, a depth camera 718 may be included in the head-mounted display 750 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 750 includes speakers 720 for providing audio output. Also, a microphone 722 may be included for capturing audio from the real environment, including sounds from the ambient environment, speech made by the user, etc. The head-mounted display 750 includes tactile feedback module 724 for providing tactile feedback to the user. In one embodiment, the tactile feedback module 724 is capable of causing movement and/or vibration of the head-mounted display 750 so as to provide tactile feedback to the user.

LEDs 726 are provided as visual indicators of statuses of the head-mounted display 750. For example, an LED may indicate battery level, power on, etc. A card reader 728 is provided to enable the head-mounted display 750 to read and write information to and from a memory card. A USB interface 730 is included as one example of an interface for enabling connection of peripheral devices, or connection to other devices, such as other portable devices, computers, etc. In various embodiments of the head-mounted display 750, any of various kinds of interfaces may be included to enable greater connectivity of the head-mounted display 750.

A Wi-Fi module 732 is included for enabling connection to the Internet via wireless networking technologies. Also, the head-mounted display 750 includes a Bluetooth module 734 for enabling wireless connection to other devices. A communications link 736 may also be included for connection to other devices. In one embodiment, the communications link 736 utilizes infrared transmission for wireless communication. In other embodiments, the communications link 736 may utilize any of various wireless or wired transmission protocols for communication with other devices.

Input buttons/sensors 738 are included to provide an input interface for the user. Any of various kinds of input interfaces may be included, such as buttons, touchpad, joystick, trackball, etc. An ultra-sonic communication module 740 may be included in head-mounted display 750 for facilitating communication with other devices via ultra-sonic technologies.

Bio-sensors 742 are included to enable detection of physiological data from a user. In one embodiment, the bio-sensors 742 include one or more dry electrodes for detecting bio-electric signals of the user through the user's skin.

The foregoing components of head-mounted display 750 have been described as merely exemplary components that may be included in head-mounted display 750. In various embodiments of the disclosure, the head-mounted display 750 may or may not include some of the various aforementioned components. Embodiments of the head-mounted display 750 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 8:
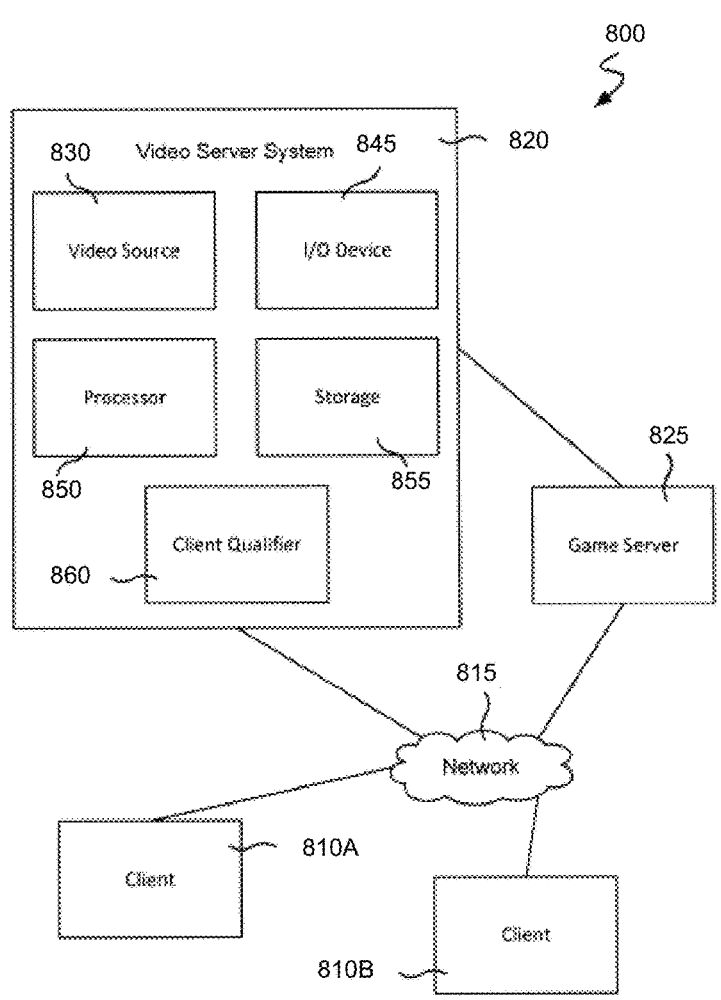
FIG. 8 is a block diagram of a Game System, according to various embodiments of the invention. Game System is configured to provide a video stream to one or more Clients via a Network.

FIG. 8 is a block diagram of a Game System 800, according to various embodiments of the disclosure. Game System 800 is configured to provide a video stream to one or more Clients 810 via a Network 815. Game System 800 typically includes a Video Server System 820 and an optional game server 825. Video Server System 820 is configured to provide the video stream to the one or more Clients 810 with a minimal quality of service. For example, Video Server System 820 may receive a game command that changes the state of or a point of view within a video game, and provide Clients 810 with an updated video stream reflecting this change in state with minimal lag time. The Video Server System 820 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 820 frames per second. Although higher or lower frame rates are included in alternative embodiments of the disclosure.

Clients 810, referred to herein individually as 810A, 810B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 810 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 810 or on a separate device such as a monitor or television. Clients 810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 810 are optionally geographically dispersed. The number of clients included in Game System 800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 820 to deliver a game viewed through the HMD. In one embodiment, the game console receives the video stream from the video server system 820, and the game console forwards the video stream, or updates to the video stream, to the HMD for rendering.

Clients 810 are configured to receive video streams via Network 815. Network 815 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 810 may, but are not required to, further include systems configured for modifying received video. For example, a client may be configured to perform further rendering, to overlay one video image on another video image, to crop a video image, and/or the like. For example, Clients 810 may be configured to receive various types of video frames, such as I-frames, P-frames and B-frames, and to process these frames into images for display to a user. In some embodiments, a member of Clients 810 is configured to perform further rendering, shading, conversion to 3-D, or like operations on the video stream. A member of Clients 810 is optionally configured to receive more than one audio or video stream. Input devices of Clients 810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 810 is generated and provided by Video Server System 820. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 810 are typically configured to receive inputs from a user. These inputs may include game commands configured to change the state of the video game or otherwise affect gameplay. The game commands can be received using input devices and/or may be automatically generated by computing instructions executing on Clients 810. The received game commands are communicated from Clients 810 via Network 815 to Video Server System 820 and/or Game Server 825. For example, in some embodiments, the game commands are communicated to Game Server 825 via Video Server System 820. In some embodiments, separate copies of the game commands are communicated from Clients 810 to Game Server 825 and Video Server System 820. The communication of game commands is optionally dependent on the identity of the command. Game commands are optionally communicated from Client 810A through a different route or communication channel that that used to provide audio or video streams to Client 810A.

Game Server 825 is optionally operated by a different entity than Video Server System 820. For example, Game Server 825 may be operated by the publisher of a multiplayer game. In this example, Video Server System 820 is optionally viewed as a client by Game Server 825 and optionally configured to appear from the point of view of Game Server 825 to be a prior art client executing a prior art game engine. Communication between Video Server System 820 and Game Server 825 optionally occurs via Network 815. As such, Game Server 825 can be a prior art multiplayer game server that sends game state information to multiple clients, one of which is game server system 820. Video Server System 820 may be configured to communicate with multiple instances of Game Server 825 at the same time. For example, Video Server System 820 can be configured to provide a plurality of different video games to different users. Each of these different video games may be supported by a different Game Server 825 and/or published by different entities. In some embodiments, several geographically distributed instances of Video Server System 820 are configured to provide game video to a plurality of different users. Each of these instances of Video Server System 820 may be in communication with the same instance of Game Server 825. Communication between Video Server System 820 and one or more Game Server 825 optionally occurs via a dedicated communication channel. For example, Video Server System 820 may be connected to Game Server 825 via a high bandwidth channel that is dedicated to communication between these two systems.

Video Server System 820 comprises at least a Video Source 830, an I/O Device 845, a Processor 850, and non-transitory Storage 855. Video Server System 820 may include one computing device or be distributed among a plurality of computing devices. These computing devices are optionally connected via a communications system such as a local area network.

Video Source 830 is configured to provide a video stream, e.g., streaming video or a series of video frames that form a moving picture. In some embodiments, Video Source 830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 825. Game Server 825 may maintain a copy of the state of the game based on game commands received from multiple players using geographically disperse clients. In these cases, the game state is provided by Game Server 825 to Video Source 830, wherein a copy of the game state is stored and rendering is performed. Game Server 825 may receive game commands directly from Clients 810 via Network 815, and/or may receive game commands via Video Server System 820.

Video Source 830 typically includes rendering logic, e.g., hardware, firmware, and/or software stored on a computer readable medium such as Storage 855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 810. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 830 includes a video recording device such as a camera. This camera may be used to generate delayed or live video that can be included in the video stream of a computer game. The resulting video stream optionally includes both rendered images and images recorded using a still or video camera. Video Source 830 may also include storage devices configured to store previously recorded video to be included in a video stream. Video Source 830 may also include motion or positioning sensing devices configured to detect motion or position of an object, e.g., person, and logic configured to determine a game state or produce video-based on the detected motion and/or position.

Video Source 830 is optionally configured to provide overlays configured to be placed on other video. For example, these overlays may include a command interface, log in instructions, messages to a game player, images of other game players, video feeds of other game players (e.g., webcam video). In embodiments of Client 810A including a touch screen interface or a gaze detection interface, the overlay may include a virtual keyboard, joystick, touch pad, and/or the like. In one example of an overlay a player's voice is overlaid on an audio stream. Video Source 830 optionally further includes one or more audio sources.

In embodiments wherein Video Server System 820 is configured to maintain the game state based on input from more than one player, each player may have a different point of view comprising a position and direction of view. Video Source 830 is optionally configured to provide a separate video stream for each player based on their point of view. Further, Video Source 830 may be configured to provide a different frame size, frame data size, and/or encoding to each of Client 810. Video Source 830 is optionally configured to provide 3-D video.

I/O Device 845 is configured for Video Server System 820 to send and/or receive information such as video, commands, requests for information, a game state, gaze information, device motion, device location, user motion, client identities, player identities, game commands, security information, audio, and/or the like. I/O Device 845 typically includes communication hardware such as a network card or modem. I/O Device 845 is configured to communicate with Game Server 825, Network 815, and/or Clients 810.

Processor 850 is configured to execute logic, e.g. software, included within the various components of Video Server System 820 discussed herein. For example, Processor 850 may be programmed with software instructions in order to perform the functions of Video Source 830, Game Server 825, and/or a Client Qualifier 860. Video Server System 820 optionally includes more than one instance of Processor 850. Processor 850 may also be programmed with software instructions in order to execute commands received by Video Server System 820, or to coordinate the operation of the various elements of Game System 800 discussed herein. Processor 850 may include one or more hardware device. Processor 850 is an electronic processor.

Storage 855 includes non-transitory analog and/or digital storage devices. For example, Storage 855 may include an analog storage device configured to store video frames. Storage 855 may include a computer readable digital storage, e.g. a hard drive, an optical drive, or solid state storage. Storage 855 is configured (e.g. by way of an appropriate data structure or file system) to store video frames, artificial frames, a video stream including both video frames and artificial frames, audio frame, an audio stream, and/or the like. Storage 855 is optionally distributed among a plurality of devices. In some embodiments, Storage 855 is configured to store the software components of Video Source 830 discussed elsewhere herein. These components may be stored in a format ready to be provisioned when needed.

Video Server System 820 optionally further comprises Client Qualifier 860. Client Qualifier 860 is configured for remotely determining the capabilities of a client, such as Clients 810A or 810B. These capabilities can include both the capabilities of Client 810A itself as well as the capabilities of one or more communication channels between Client 810A and Video Server System 820. For example, Client Qualifier 860 may be configured to test a communication channel through Network 815.

Client Qualifier 860 can determine (e.g., discover) the capabilities of Client 810A manually or automatically. Manual determination includes communicating with a user of Client 810A and asking the user to provide capabilities. For example, in some embodiments, Client Qualifier 860 is configured to display images, text, and/or the like within a browser of Client 810A. In one embodiment, Client 810A is an HMD that includes a browser. In another embodiment, client 810A is a game console having a browser, which may be displayed on the HMD. The displayed objects request that the user enter information such as operating system, processor, video decoder type, type of network connection, display resolution, etc. of Client 810A. The information entered by the user is communicated back to Client Qualifier 860.

Automatic determination may occur, for example, by execution of an agent on Client 810A and/or by sending test video to Client 810A. The agent may comprise computing instructions, such as java script, embedded in a web page or installed as an add-on. The agent is optionally provided by Client Qualifier 860. In various embodiments, the agent can find out processing power of Client 810A, decoding and display capabilities of Client 810A, lag time reliability and bandwidth of communication channels between Client 810A and Video Server System 820, a display type of Client 810A, firewalls present on Client 810A, hardware of Client 810A, software executing on Client 810A, registry entries within Client 810A, and/or the like.

Client Qualifier 860 includes hardware, firmware, and/or software stored on a computer readable medium. Client Qualifier 860 is optionally disposed on a computing device separate from one or more other elements of Video Server System 820. For example, in some embodiments, Client Qualifier 860 is configured to determine the characteristics of communication channels between Clients 810 and more than one instance of Video Server System 820. In these embodiments the information discovered by Client Qualifier can be used to determine which instance of Video Server System 820 is best suited for delivery of streaming video to one of Clients 810.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method of gaming, comprising:
receiving location based information for a game play of a user playing a gaming application as displayed on a first device, wherein the location based information is made with reference to virtual locations of a character in the game play of the user in a gaming world associated with the gaming application;
determining a predicted virtual location for the character in the game play of the user based on game plays of a plurality of users playing the gaming application and location based information for the game plays of the plurality of users that is made with reference to virtual locations of characters in the game plays of the plurality of users;

generating contextually relevant information for the predicted virtual location based on the location based information for the game plays of the plurality of users, wherein the contextually relevant information provides assistance in advancing the game play of the user;

generating a companion interface including an option to send a request for help and the contextually relevant information; and sending the companion interface to a second device associated with the user for display concurrent with the game play of the user, wherein selection of the option causes a beacon to be sent to one or more companion interfaces of one or more friends of the user, wherein the beacon is rendered in a radar mapping showing the gaming world, the beacon located at a point corresponding to a current virtual location of the character of the user in the gaming world.

2. The method of claim 1, wherein the gaming application is executing locally on the first device.

3. The method of claim 1, further comprising:
instantiating an instance of the gaming application in association with the game play of the user; and
delivering data representative of the game play of the user to the first device over a communication channel for interaction by the user.

4. The method of claim 1, wherein the generating contextually relevant information includes:
predicting a task to be completed within the game play of the user based on the predicted virtual location and the location based information for the game plays of the plurality of users; and
predicting a solution configured for completing the task based on the location based information for the game plays of the plurality of users, wherein the contextually relevant information provides assistance in completing the task based on the solution.

5. The method of claim 4, wherein the predicting the solution includes:
determining a sequence of steps necessary to accomplish the task;
delivering in the companion interface a first step in the sequence;
determining a completion of the first step within the game play of the user; and
delivering a next step in the sequence in the companion interface.

6. The method of claim 5, wherein the sequence of steps is determined based on one of the following as selected by the user:
one or more game plays of one or more users playing the gaming application; or
game play of a friend of the user playing the gaming application; or
game play of an expert playing the gaming application.

7. The method of claim 4, further comprising:
determining an asset needed by the character to accomplish the task; and
delivering a message in the companion interface offering the asset to the character.

8. The method of claim 1, further comprising:
generating a snapshot during the game play of the user for a corresponding virtual location of the character, wherein the snapshot includes game state of the gaming application and corresponding location based information for the game play of the user, wherein the snapshot enables execution of an instance of the gaming application beginning from a point in the gaming application corresponding to the snapshot;
outputting the snapshot; and
collecting the snapshot that is output.

9. The method of claim 1, wherein the location based information for the game play of the user is related to:
current assets of the character; or
current skill set of the character; or
history of task accomplishments within the gaming application; or
current geographic location of the character in the gaming world; or
progress through the gaming application in the game play of the user; or
current status of the game play; or
one or more actions of the character in the game play of the user.

10. The method of claim 1, further comprising:
receiving an acceptance of the request for help by a friend;
streaming data representative of the game play of the user to a third device associated with the friend; and
establishing a communication session conducted through companion interfaces of the user and the friend.

11. The method of claim 1, wherein the generating contextually relevant information includes:
detecting a predefined event within the game play of the user;
accessing a previously generated message from a friend of the user; and
delivering the previously generated message within the contextually relevant information.

12. The method of claim 1, wherein the assistance includes one or more of:
a solution; or
a solution in completing a task to be completed within the game play of the user; or
identification of the one or more friends of the user playing the gaming application; or
a message from a friend of the user; or
a sequence of controller inputs; or
one or more objects to avoid; or
a sequence of steps; or
a corresponding radar mapping; or
messaging; or
waypoints; or
quests; or
challenges; or
a train of related messages; or
a warning; or
expert help; or
friend help; or
an offer to purchase downloadable content.

13. The method of claim 1, wherein the predicted virtual location is based on anticipated game play of the user.

14. A method of gaming, comprising:
instantiating a first instance of a gaming application in association with a game play of a user;
delivering data representative of the game play of the user to a first device over a first communication channel for interaction by the user;
determining location based information for a character in the game play of the user, wherein the location based information is made with reference to virtual locations of the character in a gaming world associated with the gaming application;
determining a predicted virtual location for the character in the game play of the user based on game plays of a plurality of users playing the gaming application and a location based information for the game plays of the plurality of users that is made with reference to virtual locations of characters in the game plays of the plurality of users;

generating contextually relevant information for the predicted virtual location based on the location based information for the game plays of the plurality of users, wherein the contextually relevant information provides assistance in advancing the game play of the user;

generating a companion interface including an option to send a request for help and the contextually relevant information; and sending the companion interface over a second communication channel to a second device associated with the user for display concurrent with the game play of the user, wherein selection of the option causes a beacon to be sent to one or more companion interfaces of one or more friends of the user, wherein the beacon is rendered in a radar mapping showing the gaming world, the beacon located at a point corresponding to a current virtual location of the character of the user in the gaming world.

15. The method of claim 14, further comprising:
determining a task to be completed within the game play of the user;
including in the contextually relevant information an offer to complete the task;
receiving an acceptance of the offer;
instantiating a second instance of the gaming application in a first jump game play based on a first snapshot generated during execution of the first instance, wherein the first snapshot includes first game state of the first instance and the location based information for the character in the game play of the user, wherein the first jump game play begins from a point in the gaming application corresponding to the first snapshot;
generating a second snapshot during execution of the second instance of the gaming application and includes second game state of the second instance, wherein the second instance is controlled by an expert, and wherein the task is completed in the first jump game play;
instantiating a third instance of the gaming application in a second jump game play based on the second snapshot, wherein the third instance is controllable by the user for the game play of the user, wherein the task is completed in the second jump game play.

16. The method of claim 14, wherein the determining location based information for the character in the game play of the user includes:
generating a snapshot during the game play of the user for a corresponding virtual location of the character, wherein the snapshot includes game state of the gaming application and corresponding location based information for the character in the game play of the user, wherein the snapshot enables execution of an instance of the gaming application beginning from a point in the gaming application corresponding to the snapshot;
outputting the snapshot; and
collecting the snapshot that is output.

17. The method of claim 14, wherein the assistance includes one or more of:
a solution; or
a solution in completing a task to be completed within the game play of the user; or
identification of the one or more friends of the user playing the gaming application; or
a message from a friend of the user; or
a sequence of controller inputs; or
one or more objects to avoid; or
a sequence of steps; or
a corresponding radar mapping; or
messaging; or
waypoints; or
quests; or
challenges; or
a train of related messages; or
a warning; or
expert help; or
friend help; or
an offer to purchase downloadable content.

18. The method of claim 14, wherein the predicted virtual location is based on anticipated game play of the user.

19. A non-transitory computer-readable medium storing a computer program for gaming, the computer-readable medium comprising:
program instructions for receiving location based information for a game play of a user playing a gaming application as displayed on a first device, wherein the location based information is made with reference to virtual locations of a character in the game play of the user in a gaming world associated with the gaming application;
program instructions for determining a predicted virtual location for the character in the game play of the user based on game plays of a plurality of users playing the gaming application and location based information for the game plays of the plurality of users that is made with reference to virtual locations of characters in the game plays of the plurality of users;
program instructions for generating contextually relevant information for the predicted virtual location based on the location based information for the game plays of the plurality of users, wherein the contextually relevant information provides assistance in advancing the game play of user;
program instructions for generating a companion interface including an option to send a request for help and the contextually relevant information; and
program instructions for sending the companion interface to a second device associated with the user for display concurrent with the game play of the user,
wherein selection of the option causes a beacon to be sent to one or more companion interfaces of one or more friends of the user, wherein the beacon is rendered in a radar mapping showing the gaming world, the beacon located at a point corresponding to a current virtual location of the character of the user in the gaming world.

20. The computer-readable medium of claim 19, further comprising:
program instructions for instantiating an instance of the gaming application in association with the game play of the user; and
program instructions for delivering data representative of the game play of the user to the first device over a communication channel for interaction by the user.

21. The computer-readable medium of claim 19, wherein the program instructions for generating contextually relevant information includes:
program instructions for predicting a task to be completed within the game play of the user based on the predicted virtual location and the location based information for the game plays of the plurality of users; and program instructions for predicting a solution configured for completing the task based on the location based information for the game plays of the plurality of users, wherein the contextually relevant information provides assistance in completing the task based on the solution.

22. The computer-readable medium of claim 21, further comprising:
program instructions for determining an asset needed by the character to accomplish the task; and
program instructions for delivering a message in the companion interface offering the asset to the character.

23. The computer-readable medium of claim 21, wherein the program instructions for predicting the solution includes:
program instructions for determining a sequence of steps necessary to accomplish the task;
program instructions for delivering in companion interface a first step in the sequence;
program instructions for determining completion of the first step within the game play of the user; and
program instructions for delivering a next step in the sequence in the companion interface.

24. The computer-readable medium of claim 19, further comprising:
program instructions for generating a snapshot during the game play of the user for a corresponding virtual location of the character, wherein the snapshot includes game state of the gaming application and corresponding location based information for the game play of the user, wherein the snapshot enables execution of an instance of the gaming application beginning from a point in the gaming application corresponding to the snapshot;
program instructions for outputting the snapshot; and
program instructions for collecting the snapshot that is output.

25. The non-transitory computer-readable medium of claim 19, wherein the assistance includes one or more of:
a solution; or
a solution in completing a task to be completed within the game play of the user; or
identification of the one or more friends of the user playing the gaming application; or
a message from a friend of the user; or
a sequence of controller inputs; or
one or more objects to avoid; or
a sequence of steps; or
a corresponding radar mapping; or
messaging; or
waypoints; or
quests; or
challenges; or
a train of related messages; or
a warning; or
expert help; or
friend help; or
an offer to purchase downloadable content.

26. The non-transitory computer-readable medium of claim 19, wherein the predicted virtual location is based on anticipated game play of the user.

* * * * *